(12) United States Patent
Munro et al.

(10) Patent No.: US 10,048,064 B2
(45) Date of Patent: Aug. 14, 2018

(54) OPTICAL THREE DIMENSIONAL SCANNERS AND METHODS OF USE THEREOF

(71) Applicant: Adcole Corporation, Malborough, MA (US)

(72) Inventors: James F. Munro, Ontario, NY (US); Michael F. Foley, Avon, CT (US); John Brooks Reece, Chestnut Hill, MA (US); Chase Olle, Allston, MA (US)

(73) Assignee: Adcole Corporation, Marlborough, MA (US)

( * ) Notice: Subject to any disclaimer, the term of this patent is extended or adjusted under 35 U.S.C. 154(b) by 0 days.

(21) Appl. No.: 15/012,361

(22) Filed: Feb. 1, 2016

(65) Prior Publication Data

US 2016/0223319 A1  Aug. 4, 2016

Related U.S. Application Data

(60) Provisional application No. 62/150,705, filed on Apr. 21, 2015, provisional application No. 62/110,155, filed on Jan. 30, 2015.

(51) Int. Cl.
*G01B 11/24* (2006.01)
*G01B 11/25* (2006.01)
(Continued)

(52) U.S. Cl.
CPC ........ *G01B 11/2518* (2013.01); *G01C 15/002* (2013.01); *G01S 7/481* (2013.01);
(Continued)

(58) Field of Classification Search
CPC ..... G01B 11/2518; G01S 17/42; G01S 17/48; G01S 17/88; G01S 17/89; G01S 7/481; G01S 7/4813; G01S 7/4817; G01S 7/4911
(Continued)

(56) References Cited

U.S. PATENT DOCUMENTS 6,359,681 B1 *  3/2002  Housand ............... G01S 7/481
                                                  250/342
7,268,345 B2    9/2007  Schultz
(Continued)

FOREIGN PATENT DOCUMENTS

WO         2006109308 A1    10/2006

OTHER PUBLICATIONS

International Search Report for International Patent Application No. PCT/US2016/015969 (dated Apr. 28, 2016).
(Continued)

*Primary Examiner* — Tri T Ton
(74) *Attorney, Agent, or Firm* — LeClairRyan PLLC

(57) ABSTRACT

An optical scanner includes a light source located within a housing. A reticle having an aperture is positioned within the housing to receive a first light beam emitted from the light source. The reticle is configured to transmit a second light beam through the aperture. A mirror is positioned within the housing to receive the second light beam transmitted from the reticle and reflect the second light beam through a first window in the housing onto a surface of interest of an object. A light receiver is configured to receive a third light beam from the surface of interest of the object through a second window in the housing, wherein the light receiver is configured to obtain one or more light position values to determine a parameter of the surface of interest of the object. Methods for generating three-dimensional images of an object utilizing the optical scanner are also disclosed.

53 Claims, 22 Drawing Sheets

(51) Int. Cl.
*G01S 17/42* (2006.01)
*G01S 17/48* (2006.01)
*G01S 17/88* (2006.01)
*G01S 17/89* (2006.01)
*G01S 7/481* (2006.01)
*G01C 15/00* (2006.01)
*G01S 7/491* (2006.01)

(52) U.S. Cl.
CPC ............ *G01S 7/4817* (2013.01); *G01S 17/42* (2013.01); *G01S 17/48* (2013.01); *G01S 17/88* (2013.01); *G01S 17/89* (2013.01); *G01S 7/4813* (2013.01); *G01S 7/4911* (2013.01)

(58) Field of Classification Search
USPC ................................................ 356/601–640
See application file for complete search history.

(56) References Cited

U.S. PATENT DOCUMENTS

| | | | |
|---|---|---|---|
| 7,469,834 B2 | 12/2008 | Schelinski et al. | |
| 9,301,692 B2 * | 4/2016 | Kaji | A61B 5/0088 |
| 2002/0008876 A1 * | 1/2002 | Terui | G01S 7/4813 |
| | | | 356/445 |
| 2002/0171847 A1 | 11/2002 | Fukumoto et al. | |
| 2009/0190139 A1 | 7/2009 | Fisher et al. | |
| 2010/0138006 A1 | 6/2010 | Mies et al. | |
| 2010/0179675 A1 | 7/2010 | Yoshimoto | |
| 2011/0176147 A1 | 7/2011 | Marcil et al. | |
| 2013/0155418 A1 * | 6/2013 | Shaw | G01B 11/24 |
| | | | 356/612 |
| 2013/0235387 A1 | 9/2013 | Kim | |
| 2014/0022356 A1 | 1/2014 | Fisker et al. | |
| 2014/0071258 A1 | 3/2014 | Gandyra | |
| 2014/0226190 A1 | 8/2014 | Bridges et al. | |
| 2014/0247440 A1 * | 9/2014 | Yamada | G02B 26/101 |
| | | | 356/5.01 |
| 2014/0313519 A1 | 10/2014 | Shpunt et al. | |

OTHER PUBLICATIONS

Extended European Search Report for European Patent Application No. 16744273.0 (dated Jun. 11, 2018).

* cited by examiner

OPTICAL THREE DIMENSIONAL SCANNERS AND METHODS OF USE THEREOF

This application claims benefit of U.S. Provisional Patent Application Ser. No. 62/110,155 filed on Jan. 30, 2015, and U.S. Provisional Patent Application Ser. No. 62/150,705, filed Apr. 21, 2015, both of which are hereby incorporated by reference in their entireties.

FIELD

This technology generally relates to optical scanning devices and methods and, more particularly, to high speed, high accuracy three-dimensional optical scanners and methods of use thereof.

BACKGROUND

Nearly all manufactured objects need to be inspected after they are fabricated. Tactile sensing devices are often utilized to make the required measurements for the inspection. Tactile sensing devices, however, may be limited in the ability to accurately measure complex devices, particularly devices with a number of precision surfaces, or surfaces that cannot be easily reached by a tactile probe. A variety of optical devices have been developed for in-fab and post-fab inspection. Many of these optical devices scan the surface of the part and are able to determine the surface profile of the part over a limited distance or surface area of the part.

For example, consider the prior art optical scanner 1 illustrated in FIG. 1. The scanner 1 consists of a first motor 10 coupled to a lead screw 11 and threaded coupler 12, which is then coupled to a second motor 7 and polygonal mirror 6. The scanner 1 also includes a laser 21, a focusing lens 19, and an image sensor 3. All of these components are packaged in a housing 2. In operation the first motor 10 causes the threaded coupler 12, the second motor 7, and the polygonal mirror 6 to translate side-to-side along axis 22. Additionally, the second motor 7 causes the polygonal mirror 6 to rotate about the axis 22, and the angular orientation of the polygonal mirror 6 about the axis 22 is measured by the angular encoder 8. The laser 21, when activated emits a laser beam 20 which is incident on the spinning polygonal mirror 6, and whose reflected beam 23 exits the housing 2 through window 13. Reflected beam 23 is then incident on a test object 15 whose surface topography is to be measured. When both the first motor 10 and the second motor 7 are activated, reflected beam 23 will trace out a raster pattern (not shown) over a region of interest on test object 15. Reflected light 18 reflected from the raster pattern on test object 15 then passes through the focusing lens 19 which brings the reflected light 18 to a focus at a location 4 on the image sensor 3. Knowing the focus location 4, as well as the rotational position of the second motor 7 by way of the second encoder 8 and the rotational position of the first motor 10 by way of the first encoder 16, allows for the computation of the height "$H_{PO}$" of the test surface 15 for each location on the raster by the application of triangulation algorithms that are well-known in the art.

There are several limitations in the prior art. First, a laser is employed as the light source, which introduces speckle noise due to the high level of coherence present in laser light. This speckle noise ultimately reduces the signal-to-noise ratio of the signal produced by the image sensor 3 and increases the level of uncertainty of the location 4 and ultimately the level of uncertainty of height $H_{PO}$. Second, the spot of light scanned across the test object 15 has a non-eccentric elliptical or even round cross-section which provides minimal information about the spot's true location on the test object 15, and whose small perimeter—and apparent location on the image sensor 3—can be corrupted by defects, dirt, tooling marks, etc., present in or on the surface of the test object 15. Third, the accuracy of the triangulation algorithm depends upon the electro-opto-mechanical tolerances of the first encoder 8, the second encoder 16, and the surface accuracy of the polygonal mirror 6, all of which are difficult or impossible to precisely calibrate. Fourth, because two electrical motors 7 and 10 are employed, the scanner 1 will consume substantial amounts of electrical power which causes the interior of the scanner to heat up which in turn causes the internal components of the scanner to move because of the non-zero coefficient of thermal expansion (CTE) of the housing 2. In particular, movement of the image sensor 3 and the focusing lens 19 will cause the focal location 4 to lie at an incorrect location and thus lead to an erroneous calculation of $H_{PO}$. Finally, again because motors 7 and 10 are employed, the scanner 1 will not be compact and it will suffer from poor reliability because of the limited lifetimes of the motors.

SUMMARY

An optical scanner includes a light source located within a housing. A reticle having an aperture is positioned within the housing to receive a first light beam emitted from the light source. The reticle is configured to transmit a second light beam through the aperture. A mirror is positioned within the housing to receive the second light beam transmitted from the reticle and reflect the second light beam through a first window in the housing onto a surface of interest of an object. A light receiver is configured to receive a third light beam from the surface of interest of the object through a second window in the housing, wherein the light receiver is configured to obtain one or more light position values to determine a parameter of the surface of interest of the object.

A method for generating a three-dimensional image of an object includes providing an optical scanner. The optical scanner includes a light source located within a housing. A reticle having an aperture is positioned within the housing to receive a first light beam emitted from the light source. The reticle is configured to transmit a second light beam through the aperture. A mirror is positioned within the housing to receive the second light beam transmitted from the reticle and reflect the second light beam through a first window in the housing onto a surface of interest of an object. A light receiver is configured to receive a third light beam from the surface of interest of the object through a second window in the housing. The light receiver is configured to obtain one or more light position values to determine a parameter of the surface of interest of the object. The optical scanner is positioned with respect to the object. The third light beam is received by the light receiver from the surface of interest. The parameter of the surface of interest of the object is determined based on the received third light beam from the surface of interest.

The present technology advantageously provides a compact optical scanner adapted for measuring a surface located in a constricted space. The scanner consists of a light source that illuminates a cross-hair reticle which is then imaged onto a surface of interest through a MEMS (micro-electrical-mechanical system) mirror which causes the cross-hair image to scan across the surface. The light reflected or scattered by the cross-hair scanning across the surface is then collected and imaged by a telecentric lens onto an image sensor. The image sensor's cross-hair image is then read-out and digitally processed to find the location of the center of the cross-hair (i.e., that location where the two arms cross). Knowing that location, and the angular orientation of the MEMS mirror, allows the height of the test object to be calculated through a triangulation algorithm. Scanning the cross-hair across the surface and computing its location in 3D space allows a map of the surface to be rapidly constructed.

DETAILED DESCRIPTION

Figure 1:
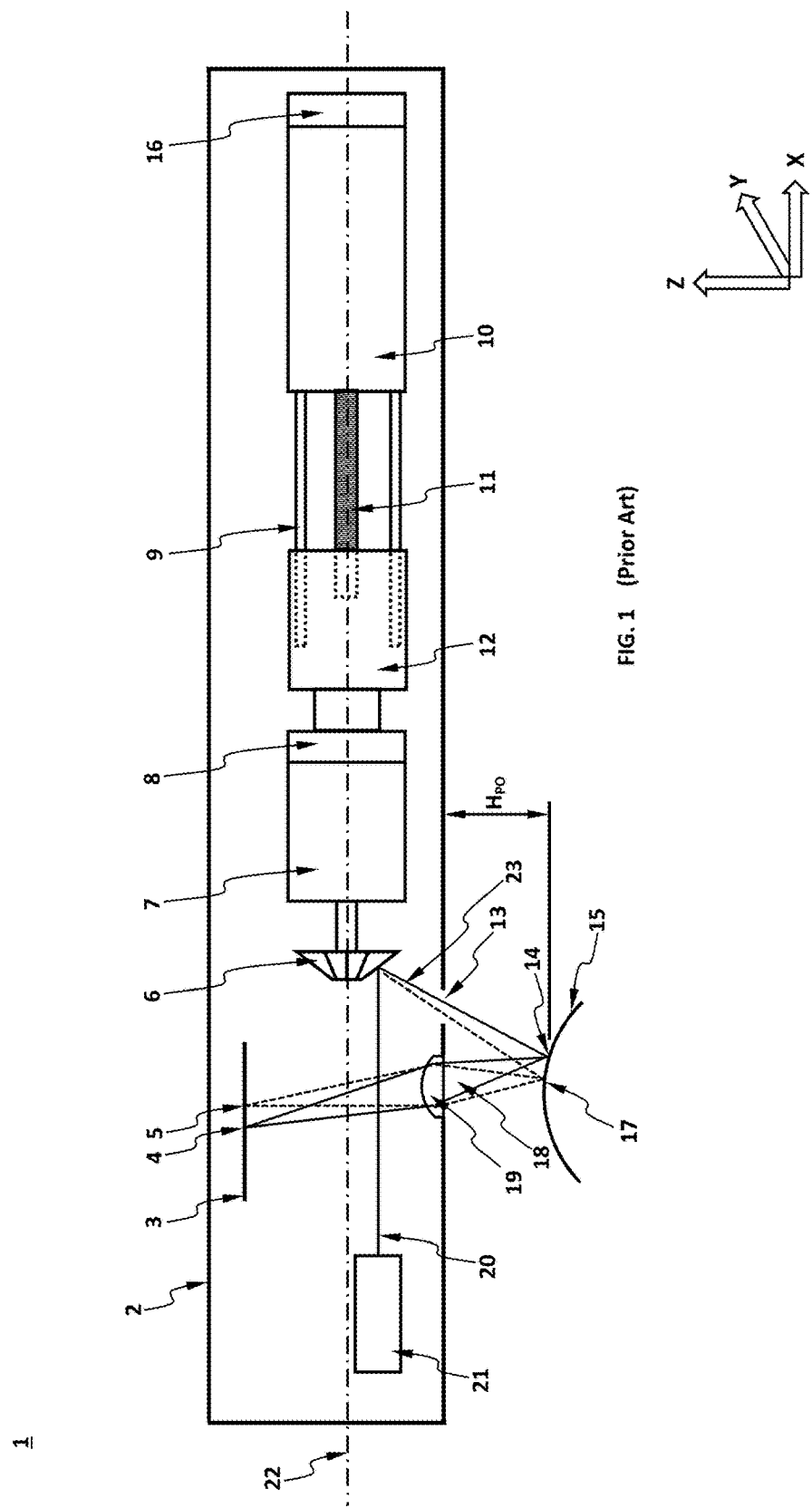
FIG. 1 is a side view of a prior art three-dimensional scanner.
Figure 2:
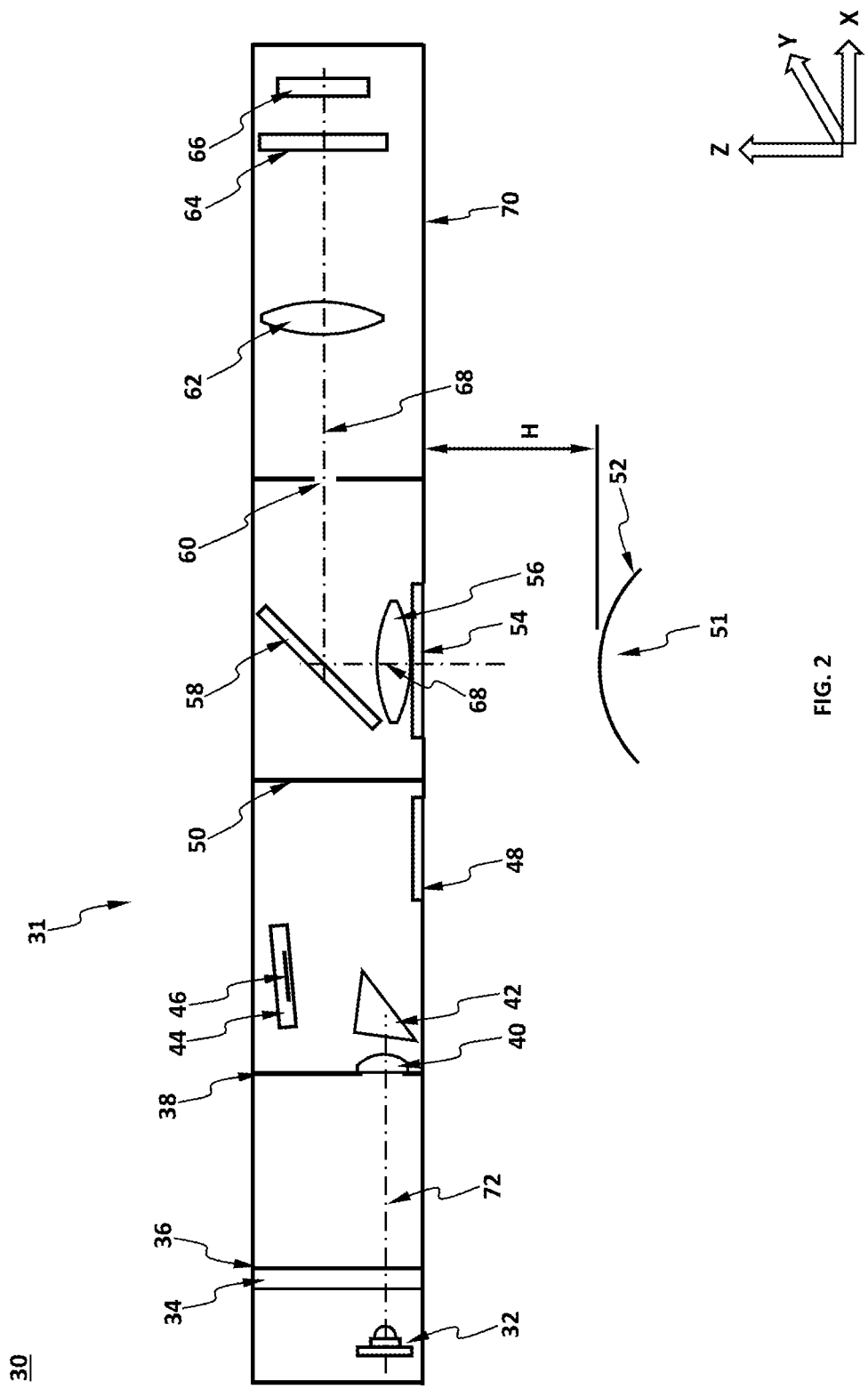
FIG. 2 is a side view of an example of a three-dimensional optical scanner.
Figure 3:
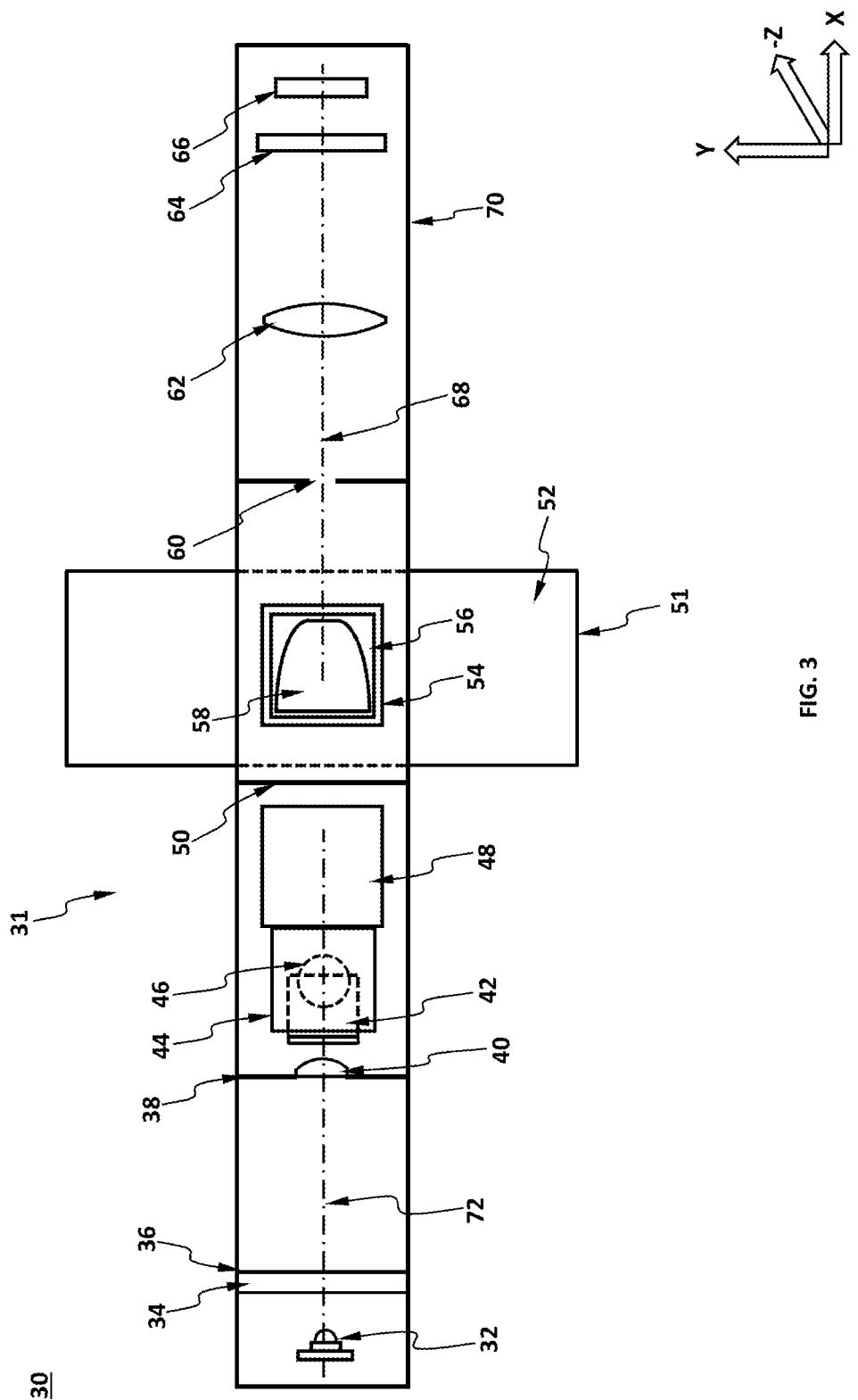
FIG. 3 is a top plan view of an example of a three-dimensional optical scanner.
Figure 4:
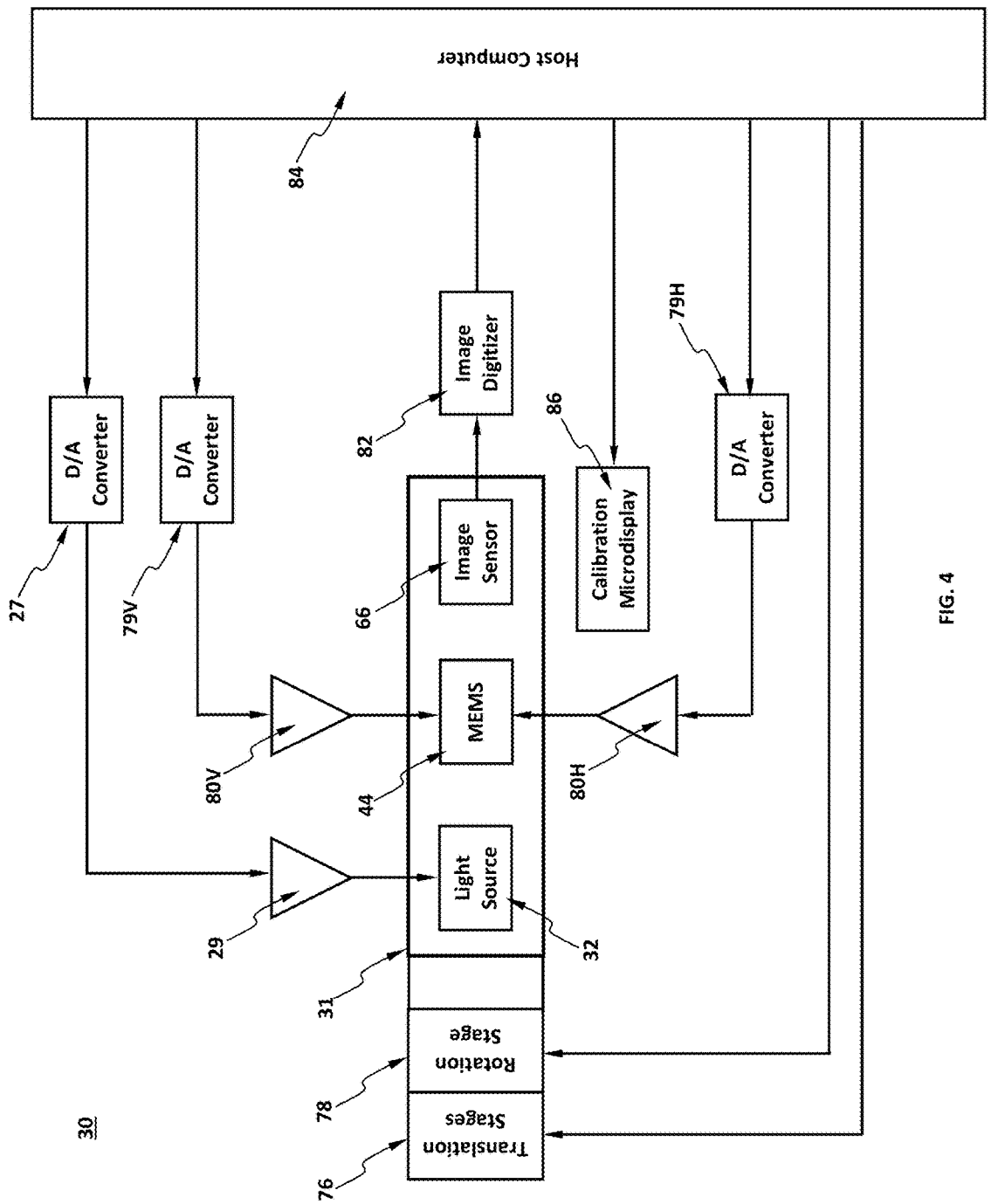
FIG. 4 is a block diagram of an example of a three-dimensional optical scanner.

An exemplary optical scanning system 30 of the present technology is illustrated in FIGS. 2-4. The optical scanning system 30 includes a scan-head 31 which can include an light source 32, a reticle 36 having a substrate 34, a stray light baffle 38, a projection lens 40, a TIRing (total internal reflecting) right-angle prism 42, a MEMS device 44 having a MEMS mirror 46, a first window 48, a second window 54, a first lens element 56 of a telecentric imaging lens, a fold mirror 58, an aperture stop 60 associated with the telecentric lens, a second lens element 62 of a telecentric imaging lens, an optical filter 64, an image sensor 66, and an enclosure 70, although the scan-head 31 can comprise other numbers and types of components in other configurations.

As illustrated in the electrical block diagram of FIG. 4, the optical scanning system 30 further includes a translation stage 76, a rotation stage 78, a vertical MEMS driver 80V, a horizontal MEMS driver 80H, an image digitizer 82, a scan management computing device 84, and a calibration micro-display 130, although the optical scanning system 30 can comprise other numbers and types of components in other configurations. The optical scanning system 30 may be utilized to scan a test object 51 to measure the surface profile or topography of a test surface 52 of the test object 51, by way of example only.

The present technology provides a number of advantages including providing high-speed, high-accuracy, high-resolution surface profiling methods and systems that are compact and able to measure such surfaces in a constricted spatial environment. This exemplary technology provides a number of advantages including providing a 3D optical scanner that may be utilized to generate a 3D map of a complex object, such as a crankshaft or camshaft, where the long distances or profiles must be measured to within a few microns of accuracy. Additionally, the small form-factor design configuration of this example of the 3D optical scanner allows for measurement of the recesses of such complex objects.

Referring again to FIGS. 2 and 3, the scan-head 31 includes two separate optical sub-systems: (1) a source arm including the light source 32, the reticle 36 having substrate 34, the stray light baffle 38, the projection lens 40, the TIRing right-angle prism 42, the MEMS device 44 having MEMS mirror 46, and the first window 48, although the source arm may include other elements, such as additional optics, in other combinations, and (2) an imaging arm including the second window 54, the first lens element 56 of a telecentric imaging lens, the fold mirror 58, the aperture stop 60 associated with the telecentric lens, the second lens element 62 of a telecentric imaging lens, the optical filter 64, and the image sensor 66, although the imaging arm may include other elements, such as additional optics, in other combinations. The source arm creates and projects an optical signal onto the test object 51 having test surface 52, and the imaging arm collects a reflection of the optical signal and images it onto the image sensor 66. Also referring to FIG. 2, the coordinate system is defined such that the X-axis is along the axis of the scan-head 31, the Y-axis is to a side of the scan-head 31, and the Z-axis runs up-down through the scan-head 31.

Referring again to FIG. 2, the light source 32 includes a light emitting diode (LED) positioned within enclosure 70, although other light sources, such as a semiconductor laser by way of example only, may be utilized. The LED light source 32 advantageously provides an optical bandwidth on the order of 20 nm, and therefore provides a light beam with low coherence, which essentially eliminates speckle seen in the final image.

The emission wavelength of the light source 32 can be any wavelength that the image sensor 66 is sensitive to, such as between 350 nm and 1100 nm for a silicon image sensor 66, although an LED that emits in a shorter wavelength range, such as less than 500 nm, may be utilized for the light source 32. Shorter wavelengths advantageously produce less diffraction when they pass through a narrow cross-hair reticle, particularly if the widths of the cross-hair slits are less than 10 µm. Furthermore, the LED emission wavelength of the light source 32 must be such that it matches the optical passband of the optical filter 64, which must also pass an emission wavelength of the calibration microdisplay 130. That is, the emission wavelength of the light source 32 must substantially coincide with an emission wavelength of the calibration microdisplay 130. It was determined empirically that the blue emissions of the non-monochrome calibration microdisplay 130 employed in the present technology had emissions in the 450 nm to 455 nm region. The light source 32 is physically small to contribute to the small form factor of the optical scanner 30, and has a narrow angular emission envelope of less than 20° so the reticle 36 is not grossly overfilled, which would result in low transmittance and optical inefficiency, although the light source 32 may have other parameters. One example of a suitable LED light source for light source 32 is the LD CN5M LED from OSRAM Opto Semiconductors (Munich, Germany) having a dominant emission wavelength of 453 nm, although other light sources from other suppliers can be utilized as well.

The light source 32 is securely positioned within the housing 70, such that the light source 32 remains both spatially and angularly stationary within the housing 70. The light produced by the light source 32 may be a continuous wave beam, although other types and/or number of light beams may be used. For example, the light emitted by the light source 32 may be pulsed and the pulsed light may be utilized by a photosensor or the image sensor 66 to distinguish the light to be measured from background light. The amplitude of the light emitted from the light source 32 also may be adjustable based on the reflectiveness and surface textures of the test surface 52, although other features of the light source 32 may be adjustable based on other factors related to the test surface 52, being mapped.

In another example, a semiconductor laser can be utilized as the light source 32. By way of example, a laser light source may be packaged in a housing that is approximately 5.6 mm in diameter to contribute to the small form-factor of the scan-head 31. The laser assembly may further include a focusing lens and an aperture such that the output light from the laser is collimated and less than 100 µm in diameter, although the light source 32 may include additional optics to provide a light beam with additional features, such as a diverging beam that critically fills or overfills the downstream reticle 36. A laser light source can emit light that the image sensor 66 is responsive to such as light in the range of 350 nm to 1100 nm, or visible light, such as a red light in the range of 600 nm to 670 nm, or blue light in the range of 420 nm to 500 nm, although the light source may emit light in the infrared or light that is intrinsically safe to the eye in the 1310-1550 nm range, by way of example only. By way of example, a laser light source may be utilized such that the 3D optical scanner 30 is a CDRH class II device, or safer.

Referring for the moment to FIG. 4, light source 32, such as an LED, is electrically coupled to a driver 29 that in turn is coupled to a D/A converter 27. The driver 29 is essentially a transconductance amplifier that outputs a specific electrical current with which to power or drive the light source 32 in response to an electrical voltage output by the D/A converter 27. Since the output voltage of the D/A converter 27 is typically in the range of 0.0 (full Off) to 5.0V (full light source 32 power), and the full power electrical current of the LD CN5M LED light source, by way of example, is 250 mA, then the transconductance gain of the driver 29 is 20 amps/volt. The bandwidth of the driver 29 can be relatively narrow, less than a few hundred Hertz, although the driver should have good thermal and temporal stability so the output current produced by driver 29 is stable over time and temperature changes.

In one example, the scan management computing device 84 controls the electrical current driving the light source 32 (and consequently the amount of light output by the light source 32). This allows for control of the brightness of the images on the image sensor 66, which can vary depending upon the texture of the test surface 52. For example, if the test surface 52 is polished (i.e., has a very mild texture), then the amount of light diffusely reflected from the test surface 52 and entering the imaging arm of the scan-head 31 will be very small, in which case the scan management computing device 84 will provide one or more instructions for the light source 32 (through the D/A converter 27 and driver 29) to increase the light output to increase the brightness of the image on the image sensor 66. On the other hand, if the test surface 52 is ground (i.e., a more aggressive texture), then the amount of light diffusely reflected from the test surface 52 and entering the imaging arm of the scan-head 31 will be larger, in which case the scan management computing device 84 will provide one or more instructions to the light source 32 (through the D/A converter 27 and driver 29) to decrease the light output in order to decrease the brightness of the image on the image sensor 66 so the image sensor 66 is not saturated in the cross-hair section of the image.

The D/A converter 27 is configured to receive one or more digital instructions from the scan management computing device 84 and outputs an analog electrical signal in response to the digital instructions. Typically the analog output signal is a voltage, and has good temporal and stability characteristics. The digital instructions from the scan management computing device 84 can be transmitted to the D/A converter over a serial bus, such as a USB bus, or a parallel data bus, although other communication methods may be utilized. The bit-wise resolution of the D/A converter 27 can be 8, 10, 12, 14, 16, 20, or even 24 bits, by way of example. In one example, the bit-wise resolution is 12 bits, which provides a good trade-off between cost and resolution.

Referring again to FIG. 2 and FIG. 3, the light source 32 is positioned such that light emitted by the LED light source 32 is directed onto the reticle 36 which has been fabricated onto the substrate 34. The substrate 34 is substantially transparent to the light emitted by the LED light source 32. The substrate 34 is also rigid, has substantially optically smooth input and output surfaces, and is dimensionally stable over a wide temperature range and the life of the scan-head 31, although the substrate 34 may have other features. The substrate 34 is composed of a material that is compatible with the material of the reticle 36 that is installed onto it. In one example, the substrate 34 has an anti-reflection coating installed onto the input surface to improve light transmittance and to reduce the amount of back-reflected stray light. An anti-reflection coating can also be installed on the output surface for the same reason, provided it is compatible with the material of which the reticle 36 is constructed. By way of example, the substrate 34 can be constructed of a polymer material, such as fused silica glass can be utilized as well.

Figure 5D:
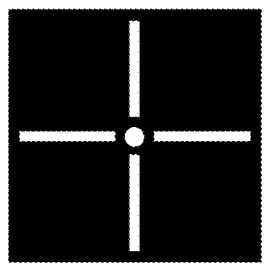
FIG. 5A through FIG. 5O illustrate several reticle patterns that can be used as the geometrical pattern projected onto the object being 3D scanned.
Figure 5H:
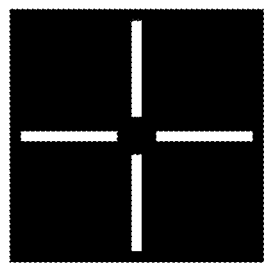
Figure 5L:
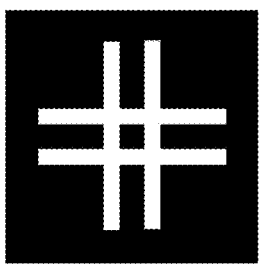
Figure 5C:
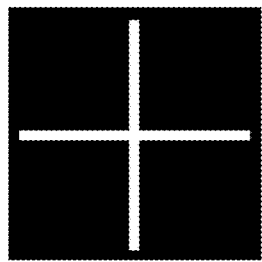
Figure 5G:
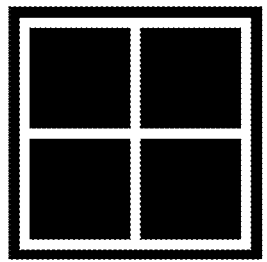
Figure 5K:
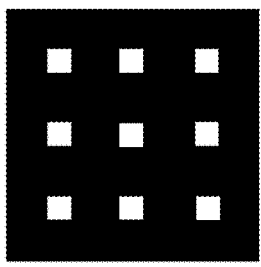
Figure 5B:
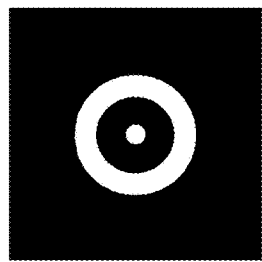
Figure 5F:
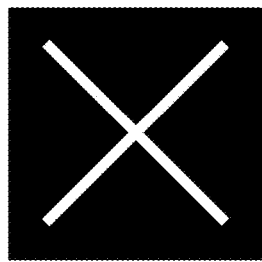
Figure 5J:
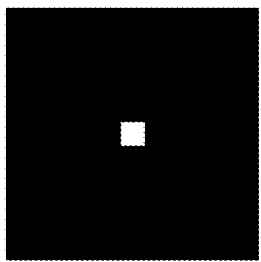
Figure 5A:
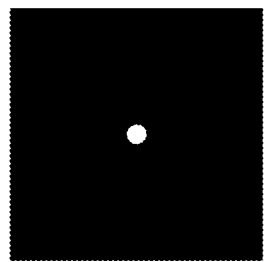
Figure 5E:
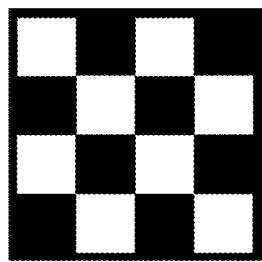
Figure 5I:
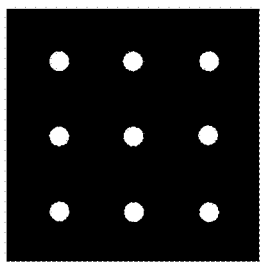
Figure 5O:
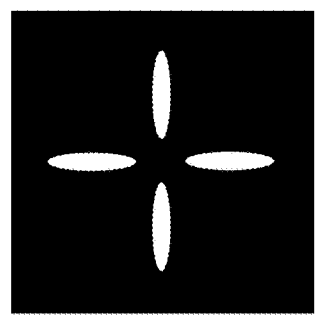
Figure 5N:
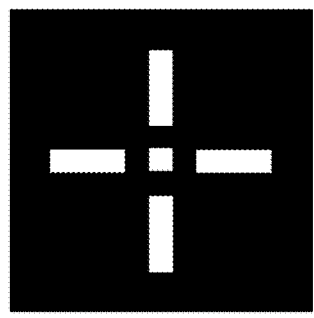
Figure 5M:
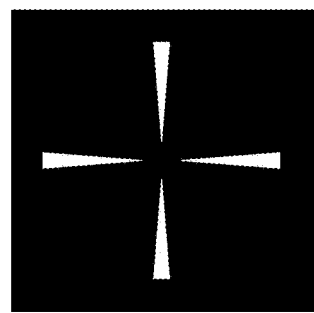

The reticle 36, which is installed onto the substrate 34, is opaque to the light emitted by the LED light source 32 except for a transmissive pattern that is subsequently projected onto test surface 52, such as a cross-hair pattern 35(1), as illustrated in FIG. 5C, although a wide variety of reticle patterns can be employed such as a round or elliptical dot 35(2) as shown in FIG. 5A, a round or elliptical bulls-eye 35(3) as shown in FIG. 5B, a cross-hair with central dot 35(4) as shown in FIG. 5D, a checkerboard pattern 35(5) as shown in FIG. 5E, a cross pattern 35(6) as shown in FIG. 5F, a boxed cross-hair 35(7) as shown in FIG. 5G, a center-void cross-hair 35(8) as shown in FIG. 5H, an array of circular or elliptical dots 35(9) as shown in FIG. 5I, a central square or rectangle 35(10) as shown in FIG. 5J, an array of squares or rectangles 35(11) as shown in FIG. 5K, a hash-tag pattern 35(12) as shown in FIG. 5L, triangular cross-hairs 35(13) as shown in FIG. 5M, rectangular cross-hairs with a central square 35(14) as shown in FIG. 5N, or elliptical cross-hairs 35(15) as shown in FIG. 5O, although other patterns consisting of combinations or permutations of the above patterns can be utilized as well.

The transmissive pattern utilized, such as cross-hair 35(1), may be paired with an image processing algorithm that provides for good localization of the center of the pattern when it is projected onto the test surface 52 and subsequently imaged onto the image sensor 66. The opaque portions of the reticle 36 are relatively thin so the reticle 36 does not have side-walls that can reflect light and blur the projected image of the reticle 36 on the test surface 52. Furthermore, the opaque portions should be free from pinholes and other transmissive defects that can appear to be part of the desired pattern and confuse the downstream image processing and localization algorithm.

The reticle 36 is typically installed onto the substrate 34 with a deposition process, although other processes can be utilized as well. The opaque material of the reticle 36 can be absorptive to the light emitted by the LED light source 32, or it can be reflective. Absorptive materials reduce the potential for stray light causing glints or reduced contrast of the image.

By way of example, the material the reticle 36 is fabricated from can be chrome or black chrome, although other materials can be utilized as well. In one example, instead of the reticle 36 being installed on the output surface of the substrate 34, it can be installed on the input surface of the substrate 34 instead. Alternately, the reticle 36 can be made thicker and self-supporting such that the substrate 34 can be eliminated.

A stray light baffle 38 is installed in the optical path between the reticle 36 and the MEMS mirror 46 to ensure that the projected light (108 in FIG. 9) does not overfill the MEMS mirror 46 because any light that reaches the MEMS device 44 and is not incident on the MEMS mirror 46 will generate stray light which can cause glints or reduce the contrast of the image of the cross-hair on the test surface 52. As such, by way of example the stray light baffle 38 can be placed immediately before the projection lens 40, with its aperture substantially centered on the axis 72 of light source 32, although the stray light baffle 38 could also be installed immediately after the projection lens 40, or immediately after the right-angle prism 42.

The stray light baffle 38 has an aperture that is elliptical in shape, being wider in the Y-direction than in the Z-direction, such that the light (106 in FIG. 9) that passes through it has a circular cross-sectional shape at the MEMS mirror 46 such that the light slightly under-fills MEMS mirror 46, although the aperture may have other configurations, such as a polygonal. In this example, the major axis of the ellipse in the Y-direction is 4.2 mm and the length of the minor axis in the Z-direction is 3.4 mm, although other axes lengths can be utilized. The stray light baffle 38 can be made from a clear substrate and opaque coating like the substrate 34 and the reticle 36, although, because the opto-mechanical tolerances of the stray light baffle 38 are less critical than the reticle 36, the stray light baffle 38 can be made from any self-supporting opaque material such as a polymer or sheet metal provided the aperture can be cut or stamped into the material with good fidelity.

A right angle prism 42 is placed in the optical path of the projected light beam (106 in FIG. 9), and operates as a mirror to reflect the projected light beam. That is, light enters a short side of the right angle prism 42 and is subsequently incident on the hypotenuse of the right angle prism 42, whereupon the light undergoes TIR and is reflected to the second short side of the right angle prism 42, whereupon it exits the right angle prism 42. The right angle prism 42 can be made from any material that is transmissive to the light emitted by the LED light source 32, such as glass, such as BK7 glass or fused silica glass, machined and polished to the desired geometry, although other materials, such as a polymer may be utilized.

The size of the input and output faces of the right angle prism 42 must be large enough to accept the full cross-sectional area of the projected light beams, which is limited by the size of the aperture of the stray light baffle 38, said elliptical aperture having major and minor axes of 4.2 mm and 3.4 mm as discussed above. Given these dimensions, in one example, right angle prism 42 has short side sizes of 5 mm×5 mm. For example, the right angle prism 42 may be the RPB1-05-550 right angle prism from OptoSigma (Santa Ana, Calif., USA), although other right angle prisms may be utilized.

The right angle prism 42 has nominal prism angles of 45°-90°-45°, although the prism need not be a right angle prism and can have alternate angles, such as 40°-100°-40°, so long as TIR is maintained at the hypotenuse. An antireflective (A/R) coating is installed on both the input and output faces of the right angle prism 42 to prevent unwanted light reflections of the projected light beam that can lead to undesirable ghost images of the cross-hair 35(1) on the on the test surface 52. In another example, the right angle prism 42 can be replaced with a first-surface mirror (or a second surface mirror with a good A/R coating on the first surface.

The MEMS device 44 includes an electrostatic actuator (not shown) and a MEMS mirror 46 that rotates about a pivot point in response to the electrostatic field produced by the electrostatic actuator. That is, in response to a pair of applied voltages, the MEMS mirror 46 can be made to rotate about two separate axes of the MEMS device 44. The ability to control the angular orientation of the MEMS mirror 46, and quickly change the angular orientation of the MEMS mirror 46, provides the ability to cause the projected LED light (108 in FIG. 9) to be scanned as it is reflected from the MEMS mirror 46. This reflected scanning projected light (110 in FIG. 9) is subsequently scanned across the surface of interest 52 in accordance with the changing angular orientation of the MEMS mirror 46.

The MEMS device 44 is available with a variety of rotatable mirror sizes, scan speeds, scan resonant frequencies, and scan power. Furthermore the MEMS device 44 can operate in a resonant mode where the scan mirror 44 vibrates or resonates at preferred frequency—in one or both axes—or it can operate in a point-to-point mode in which the angular orientation of the MEMS mirror 46 is commanded to specific locations in a step-and-repeat mode by the vertical MEMS driver 80V or horizontal MEMS driver 80H and scan management computing device 84. A feedback mechanism (not shown) can be provided for ascertaining the exact angular orientation of the MEMS mirror 46, or it can operate without benefit of a feedback mechanism, instead relying upon predefined calibration parameters for positioning.

The MEMS mirror 46 generally has a round perimeter, and is available in diameters from 0.8 mm to 5.0 mm from Mirrorcle Technologies (Richmond, Calif., USA) although other mirror sizes from other suppliers may be utilized. In one example, a MEMS mirror 46 having a diameter of 4.2 mm, is slightly larger than the width of the beam of projected light at the location of the MEMS device 44, may be utilized. The 4.2 mm diameter MEMS mirror 46 provides sufficiently low mass to provide good temporal characteristics and linearity.

The MEMS device 44 is available in several LCC (Leadless Chip Carrier) packages, including the LCC20, which is sufficiently small and compact to fit inside the housing 70. A transparent glass window (not shown) is generally installed on the MEMS device 44 immediately in front of the MEMS mirror 46 to protect the fragile MEMS mirror 46 and electrostatic actuator from dust and incidental contact with objects that can cause damage to the MEMS device 44. However, the glass window can cause stray light and ghost reflections which can compromise the performance of the scanner, in which case it is best to remove the glass window from the MEMS device (especially if the housing 70 can protect the MEMS device 44 from dust and incidental contact) or, at a minimum, install an A/R coating on one or both sides of the window.

As mentioned earlier, the MEMS mirror 46 within the MEMS device 44 is capable of being rotated in two axes. Referring to FIG. 4, a horizontal driver 80H is electrically coupled to the side-to-side actuator of the MEMS device 44 and causes the MEMS mirror 46 to rotate in a side-to-side direction (i.e., the $\theta$ direction in FIG. 11). Likewise a vertical driver 80V is electrically coupled to the up-down actuator of the MEMS device 44 and causes the MEMS mirror 46 to rotate in an up-down direction (i.e., the $\phi$ direction in FIG. 11).

In particular, for the Mirrorcle A7B2.1 actuator, applying a bias voltage of 70V causes the MEMS mirror 46 to rotate to the center of its angular range for a given axis; applying a voltage of 0V will cause the electrostatic actuator of the MEMS device 44 to rotate the MEMS mirror 46 to −4.86°; applying a voltage of 140V will cause the electrostatic actuator of the MEMS device 44 to rotate the MEMS mirror 46 to +4.86°. The vertical driver 80V and the horizontal driver 80H produce these voltages, 0 to 140V for the A7B2.1 actuator, linearly in accordance with the voltages input to them from the vertical D/A converter 79V and the horizontal D/A converter 79H. That is, vertical driver 80V and horizontal driver 80H are linear amplifiers that, for example, accept as input a signal between 0.0 and 5.0V from their respective D/A converter (79V and 79H), and output a signal between 0.0 and 140V. As such, the voltage gain of vertical driver 80V and horizontal driver 80H in this example is 140.0/5.0=28.

The amplifiers of vertical driver 80V and horizontal driver 80H have a bandwidth that includes 0.0 Hz (i.e., can accommodate DC input voltages) and have a limited bandwidth by way of a built-in low-pas filter. This low-pass filter can act to reduce the output noise of the vertical driver 80V and horizontal driver 80H, but more importantly the filtering can limit the ringing the MEMS mirror 46 will undergo when ordered to instantaneously change its angular position. A $6^{th}$ order Bessel low-pass filter integrated with the vertical driver 80V and the horizontal driver 80H will limit the ringing as it has been found to substantially critically damp the motion of the MEMS mirror 46, although other low-pass filter types and orders will work as well. The response of the amplifiers within the vertical driver 80V and the horizontal driver 80H driver are exceptionally linear so the MEMS mirror 46 moves angularly in exact proportion to the voltage output by the vertical A/D converter 79V and horizontal A/D converter 79H so the precise angular position of the MEMS mirror 46 is known. Alternatively, the angular motion of the MEMS mirror 46 is measured as a function of voltages output by the vertical A/D converter 79V and horizontal A/D converter 79H and calibrated before an accurate scan can be made.

Projected light 110 reflected from the MEMS mirror 46 passes through a first window 48 that is installed in an opening of the housing 70. The housing 70, together with first window 48 and second window 54 nominally envelopes and encloses all of the electrical, optical, and mechanical components comprising the scan-head 31, and, furthermore, seals these components from the outside environment so that airborne dust, oils, vapors, smoke, etc., cannot enter the scan-head 31 and settle on or otherwise contaminate the surfaces within scan-head 31. The first window 48 contributes to this environmental sealing function while also allowing the projected light 110 to pass through relatively unattenuated and without being optically distorted or aberrated.

The first window 48 is planar on both its input and output surfaces (i.e., both surfaces should have no optical power) so the direction of the exiting light rays are the same as the light rays entering the window. The first window 48 has sufficient width to nominally allow substantially all of the projected light 110 to exit the housing 70 over the full range of the MEMS mirror 46 to allow the projected light 110 to scan across the surface 52 of the test object 51. The first window 48 is constructed of glass, although a polymer may be utilized in some examples. In one example, the first window 48 is made from fused silica, which provides a low coefficient of thermal expansion (CTE) which matches the low CTE of the housing 70. Furthermore, since the exterior surface of the first window 48 will need to be cleaned periodically, glass or fused silica will resist incidental scratching and damage.

In one example, at least the interior surface of the first window 48 is A/R coated to minimize Fresnel reflections and to maximize the amount of the projected light 110 passing through the window. In another example, the exterior surface of the first window 48 is also be A/R coated, provided it is mechanically robust enough to withstand periodic cleaning. The A/R coatings for the first window 48 are optimized for the wavelength emitted by the light source 32 and for the angle of incidence of the projected light 110 at the entrance and exit surfaces of the first window 48.

The design of the scan head 31 may be tailored to the particular test object 51 having test surface 52 to be measured. By way of example, the test object 51 can be any solid object that has a surface 52 whose topography is to be accurately measured. The texture of the test surface 52 can be polished, brushed, pixelated (i.e., made with an additive or 3D printing process) ground, sawn, wavy, honed, cast, burnished, etched, or any other texture that diffusely scatters at least a very small percentage, such as 0.001%, of the light incident on the test surface 52.

Test object 51 materials may include glass, polymer, metal, and wood, although other materials are suitable as well. A typical test object 51 is one in which the topography of the surface to be measured is complex, such as propellers, turbine blades, cam shafts, and crank shafts, and may have concavities or recesses whose topography cannot be measured because they are obscured by other portions of the test object 51, or may have a test surface 52 that is difficult to reach such as the case with a crank shaft, although test objects 51 with other features may be measured using the present technology.

Figure 6:
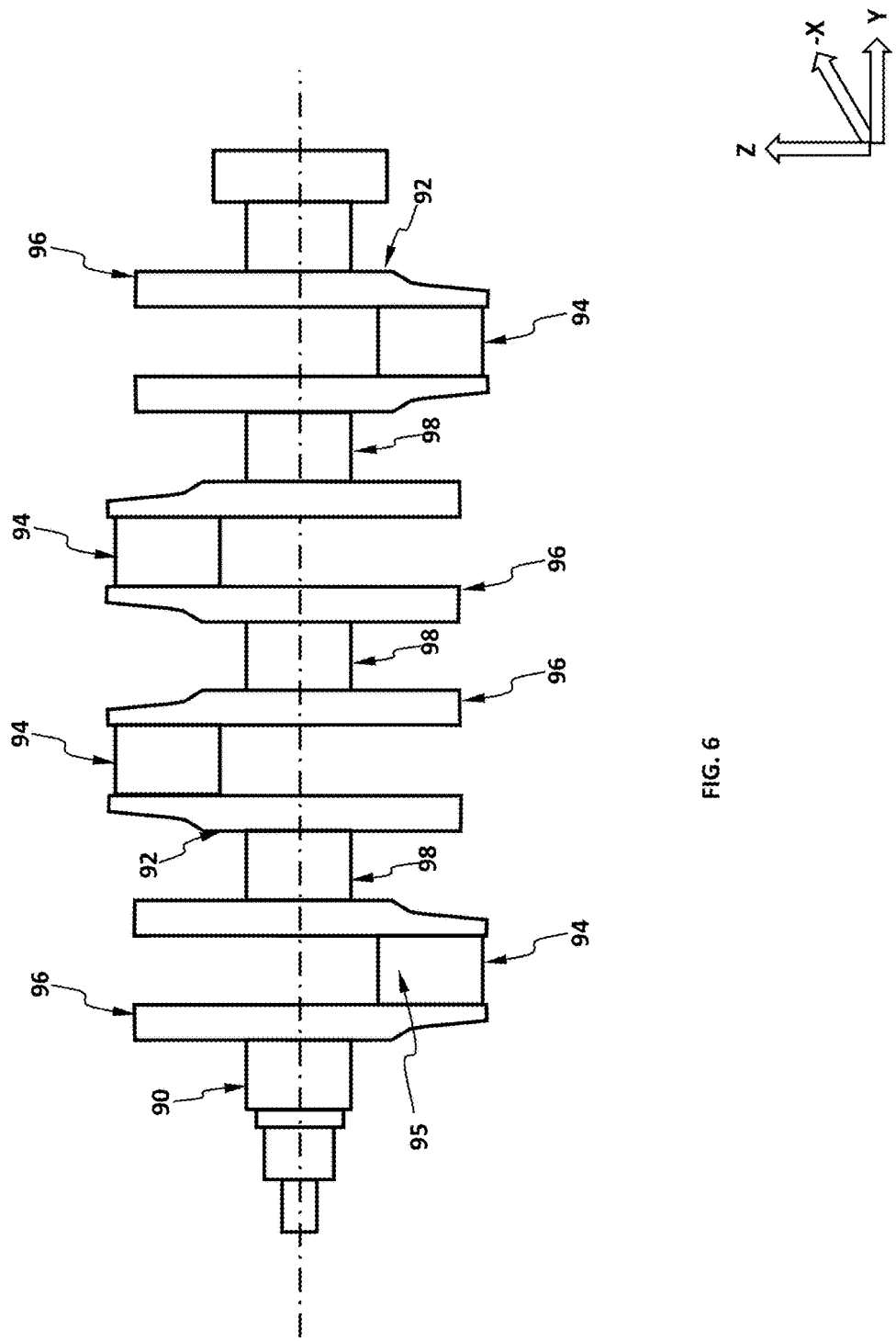
FIG. 6 is a side view of a crank shaft.
Figure 7:
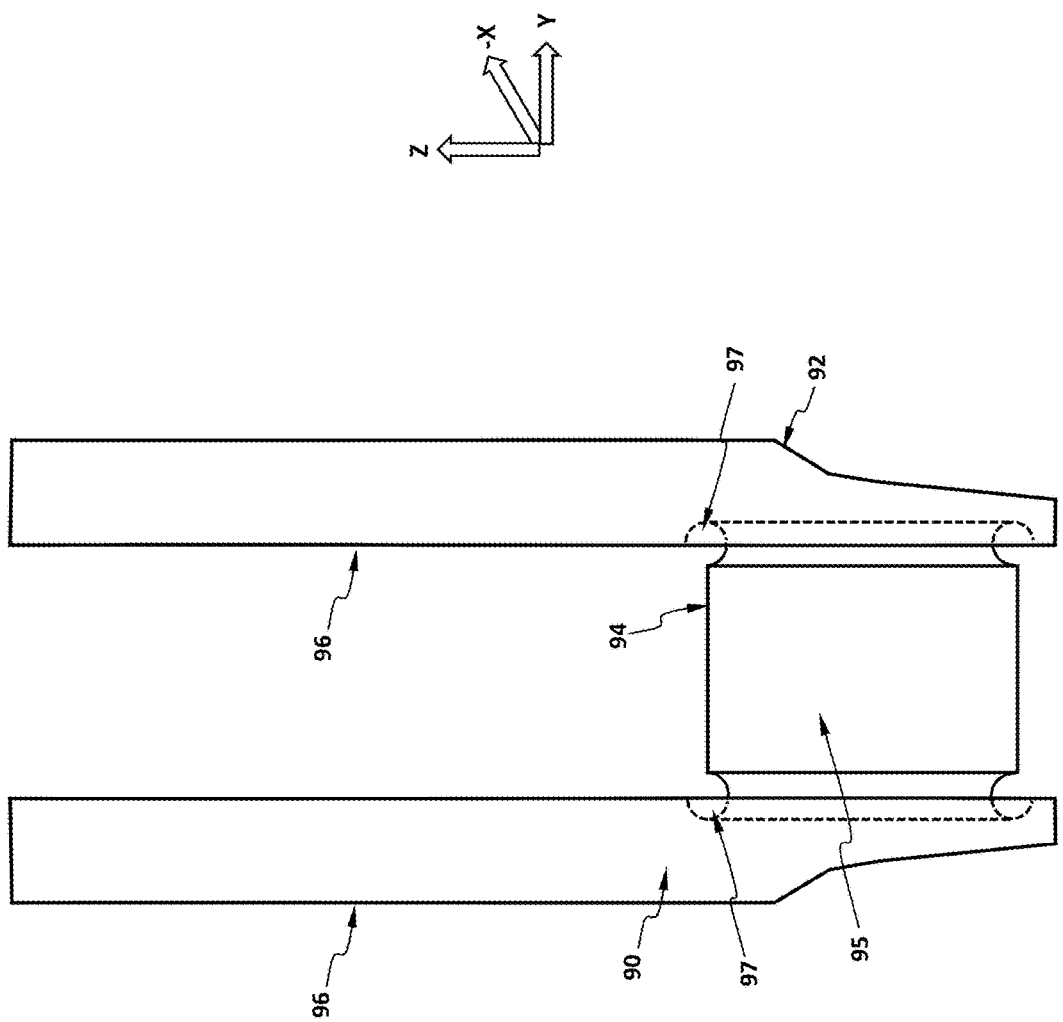
FIG. 7 is an enlarged portion of the crank shaft of FIG. 6, highlighting the undercut portion of the crank shaft.

FIG. 6 illustrates a typical internal combustion engine crank shaft 90 that may be measured using the present technology. Crank shaft 90 includes main bearing journals 98, pin journals 94 having pin journal surfaces 95, counterweights 96, and connecting webs 92. FIG. 7 is a more detailed drawing of a pin of a crank shaft 90 showing the counterweights 96, a pin journal 94 with journal surface 95, and undercuts 97. Undercuts 97 are critically important to the reliability of a crank shaft 90 because they distribute the stress a crank shaft encounters at the intersection between the pin journal 94 and the connecting web 92. As such, the location, depth, and radius of the undercuts 97 must be fabricated to tight tolerances, and being able to measure the location, depth, radius, and other parameters of the undercuts 97 is essential to ensuring that the crank shaft 90 was correctly fabricated and will perform reliably when installed in an engine. Unfortunately, the undercuts 97 are difficult to measure for at least two reasons: first the undercut can extend into connecting web 92 in which it is a concave recess that cannot be inspected with conventional tactile and optical (shadowgraphic) methods, and secondly it is difficult to insert a large measurement probe into the small space between the two connecting webs 92.

Figure 8:
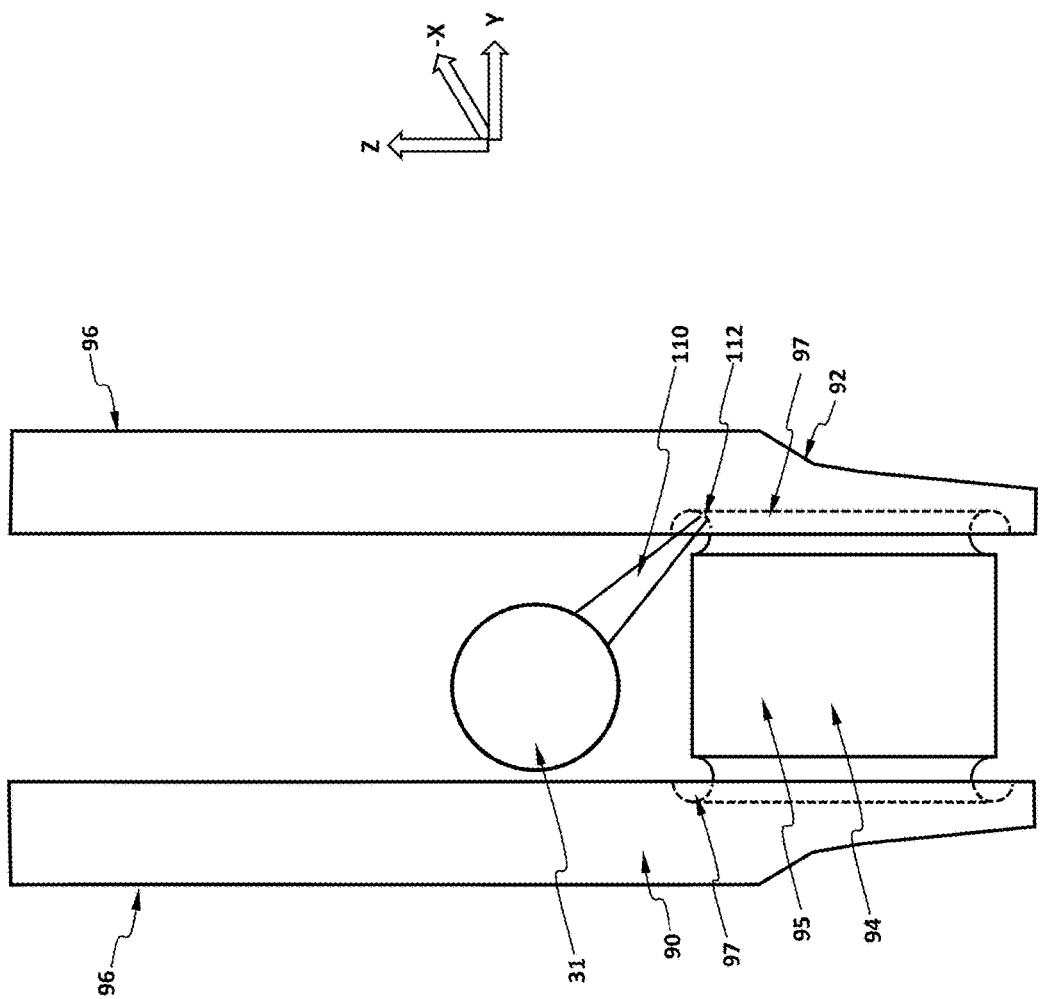
FIG. 8 is a diagram that illustrates the location of the three-dimensional optical scanner with respect to an undercut being measured in its measurement position.

FIG. 8 illustrates how the scan-head 31 of the present technology can be inserted into the space between the counterweights 96 and connecting webs 92 of a crank shaft 90 in an orientation that allows the optical scanning system 30 to measure the location, orientation, radius, and other topographical features of an undercut 97. Note that the long axis—not shown but oriented into and out of the plane of the paper—of the scan-head 31 is parallel to the planes of the connecting webs 92, and the diameter of the scan-head 31 is less than the width of the space between the connecting webs 92 so the scan-head 31 fits comfortably between the connecting webs. The scan-head 31 is positioned laterally (i.e., in Y and Z axes), longitudinally (i.e., in the X direction) and rotationally (i.e. about the X axis) so the projected light 110 is able to illuminate the undercut 97 at an illumination location 112 without being clipped by a corner of a connecting web 92 or a corner of a pin journal 94. Note illumination location 112 is an image of the cross-hair 35(1) of the reticle 36.

A portion of the light that is diffusely reflected from the projected light at illumination location 112 re-enters the scan-head 31 through the second window 54 that is installed in a second opening of the housing 70. The housing 70, together with first window 48 and the second window 54 nominally envelopes and encloses all of the electrical, optical, and mechanical components comprising the scan-head 31, and, furthermore, seals these components from the outside environment so that airborne dust, oils, vapors, smoke, etc., cannot enter the scan-head 31 and settle on or otherwise contaminate the surfaces within scan-head 31. The second window 54 contributes to the environmental sealing function while also allowing the diffusely reflected light 114 to pass through relatively unattenuated and without being optically distorted or aberrated.

The second window 54 is planar on both its input and output surfaces (i.e., both surfaces should have no optical power) so the direction of the exiting light rays are the same as the light rays entering the window. The second window 54 is made from glass, such as fused silica, although other materials such as a polymer may be utilized. In particular, the second window 54 made from fused silica provides a low coefficient of thermal expansion (CTE) which matches the low CTE of the housing 70. Furthermore, since the exterior surface of the second window 54 will need to be cleaned periodically, a harder material such as glass or fused silica will resist incidental scratching and damage.

In one example, at least the interior surface of the second window 54 is A/R coated to minimize Fresnel reflections and maximize the amount of diffusely reflected light 114 passing through the window. In another example, the exterior surface of the second window 54 is also A/R coated, provided it is mechanically robust enough to withstand periodic cleaning. The A/R coatings are optimized for the wavelength emitted by the light source 32 and for the angle of incidence of the diffusely reflected light 114 at the entrance and exit surfaces of the second window 54.

Because a small amount of wave-guiding will occur in the first window 48, in which miniscule flaws in the first window 48 will redirect some of the projected light 110 in a way that it TIRs between the entrance and exit surfaces of the first window 48, the first window 48 and the second window 54 must be separate optical elements separated by a light absorbing material. Otherwise, the TIRing wave-guided light within the window can be re-directed (a second time) out of the window in the imaging path of the scan-head 31 due to the miniscule flaws in the window in the area of the imaging path. This re-directed light, which is stray light, can then enter the imaging path through telecentric first lens element 56 and reduce the contrast or SNR (signal-to-noise-ratio) of the image of the cross-hairs on the image sensor 66.

The reflected light 114 that passes through the second window 54 then enters the telecentric imaging lens, which includes the first lens element 56, the aperture stop 60, and the second lens element 62. The telecentric lens creates an image of the cross-hairs 35(1) projected onto the test surface 52 on the image sensor 66. The cross-hair image on the image sensor 66 has good fidelity: i.e., it is not blurry or aberrated, is substantially free from barrel and pincushion distortion, and the size of the image should not change as the distance, "H" between the test surface 52 and the scan-head 31 varies. Indeed, a telecentric lens is one in which the size of the image does not change as a function of object distance. If the size of the image also does not change when the back focal distance (in this case the distance between the lens element two 62 and the image sensor 66) varies, then the lens is said to be doubly telecentric.

It is important that the image size does not vary with object distance, $H_{OH}$ because the cross-hair occupies a substantial width on the test surface 52, over which the distance $H_{OH}$ can vary by several millimeters, especially when measuring an undercut 97. If the lens is not telecentric in object space then the image of the cross hair on an undercut 97 test surface 52 will be distorted on the image sensor 66, making the image processing task much more difficult.

It is also important that the image size on the image sensor 66 does not vary with back focal distance because the back focal distance can change as the scan-head 31 warms up and expands. This can be particularly problematic in the area near the image sensor 66 as it can consume up to two Watts of electrical power during operation and generate significant amounts of heat in the process. The magnification of the telecentric lens can be between −0.2 and −2.0, depending upon the size of the cross-hair 35(1) on the test surface 52 and the size of the image sensor 66, although lenses having a magnification closer to −1.0 are easier to design, fabricate, and assemble. While the vast majority of the optical distortion and non-telecentricity can be eliminated from the lens by way of good design practices, some residual distortion and non-telecentricty will remain, which must be eliminated with a lens calibration process as discussed below in connection with FIG. 14.

In this example, the first lens element 56, and the second lens element 62, are both positive lenses to facilitate fabrication, which can be an injection molded process (for polymer materials), diamond turned, precision molded (for glass materials), MRF (magneto-rheological finishing) process, or any other lens fabrication process. Of the two optical surfaces on each of the first lens element 56, and the second lens element 62, one, both, or neither of the surfaces can be aspherical, being spherical instead.

The center thickness of the first lens element 56, and the second lens element 62, can be between 1.0 mm and 10 mm, by way of example. The diameter of the first lens element 56, and the second lens element 62 can be between 5 mm and 20 mm, by way of example. In one example, each of the two optical surfaces of the first lens element 56 and the second lens element are A/R coated to maximize the amount of the image light 116, 118, 120, and 122 passing through them and to minimize stray light which can cause ghost images and otherwise reduce the fidelity (including the contrast) of the cross-hair image on the image sensor 66. The first lens element 56 and the second lens element 62 can be formed of glass, such as BK7 glass or fused silica, although other materials, such as a polymer such as acrylic, polycarbonate, or polystyrene, may be utilized. In this example, the first lens element 56 and the second lens element 62 are fabricated from fused silica because of its low CTE and excellent optical characteristics.

The aperture stop 60 of the telecentric lens blocks highly aberrated light rays from reaching the image plane at the image sensor 66 and creates the telecentricity properties of the telecentric lens. In general, the smaller the aperture in the aperture stop 60 the better a lens performs, although less light will transmit through a smaller aperture and the image will appear fainter at the image plane on the image sensor 66. An aperture diameter of 2.0 mm, by way of example is suitable, although aperture diameters of between 0.3 mm and 5.0 mm can work as well.

The aperture stop 60 is constructed from an opaque material such as a metal or polymer, and ideally is blackened or otherwise is made light absorbing to reduce reflections which can produce stray light. In one example, aperture stop 60 is made from a thin sheet metal such as aluminum which is then black anodized to be highly light absorbent. The aperture stop 60 extends substantially across the entire width of the telecentric lens so undesirable light rays do not have the opportunity to go around the aperture stop 60 or have an alternate path for reaching the image sensor 66.

Light 122 that passes through the telecentric lens must then pass through the optical filter 64 before reaching the image sensor 66. The optical filter 64 is a bandpass filter that substantially blocks all wavelengths of light that the image sensor 66 is sensitive to except the wavelength of light that is emitted by the light source 32. In this way the cross-hair image 35(1), which consists of light emitted by the light source 32, is allowed to reach the image sensor 66 while objectionable ambient light that originates outside of the enclosure 70 and enters the scan-head 31 through second window 54 and subsequently passes through aperture stop 60 is prevented from reaching the image sensor 66, provided said objectionable ambient light is composed of wavelengths other than that emitted by light source 32. By blocking these objectionable ambient light signals the contrast and SNR of the cross-hair image 35(1) on the image sensor 66 is improved, and spurious glints and stray light rays are blocked and prevented from corrupting the image.

The optical filter 64 has a pass-band transmittance of at least 50%, although the optical filter 64 may have a pass-band transmittance of at least 70% or at least 90%1. The full-width half-maximum (FWHM) width of the passband can be between 2 nm and 50 nm, although a range of 10 nm and 20 nm may be utilized, centered on the emission wavelength of the light source 32. The optical filter 64 should block at least 99.99% of the light down to the lower wavelength limit of the image sensor 66, which is approximately 350 nm since the image sensor 66 is made from silicon, by way of example. The optical filter 64 should also block at least 99.99% of the light up to the upper wavelength limit of the image sensor 66, which is approximately 1100 nm since the image sensor 66 is made from silicon, by way of example.

Figure 10:
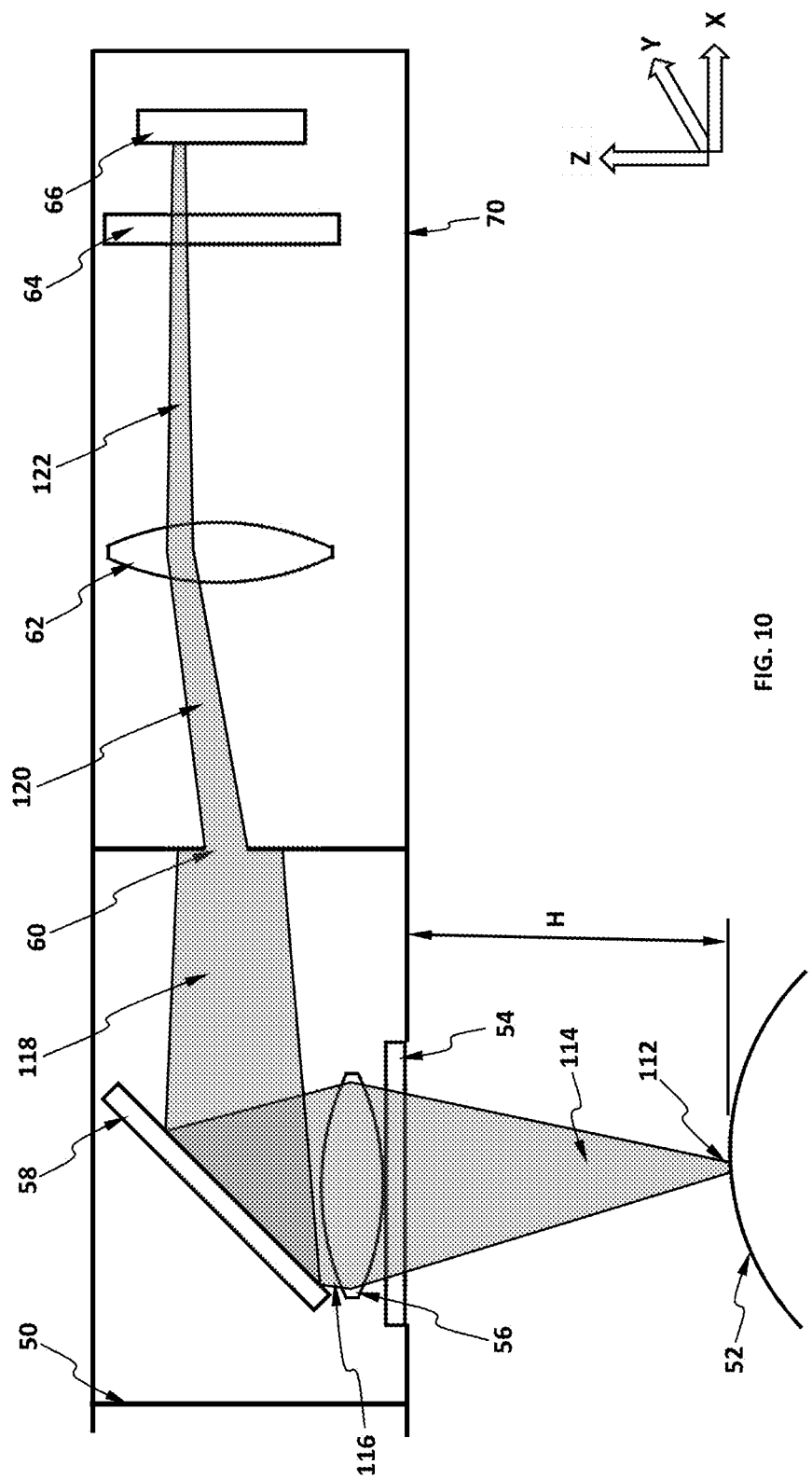
FIG. 10 is a ray diagram of an example of the three-dimensional optical scanner that illustrates the propagation of the rays in the imaging arm of the scanner.

The optical filter 64 should be placed in that portion of the imaging arm where the light is substantially telecentric, so the light's angle of incidence is as close to zero degrees as possible. One location is in front of the first lens element 56, at or near the second window 54; indeed, the optical filter 66 can even be integrated within second window 54. A second location for the optical filter 66 is where it is shown in FIG. 10: immediately in front of the image sensor 66. In one example, the optical filter 64 can be cemented directly to the input face of image sensor 66, which has the advantages of 1) substantially eliminating Fresnel reflections from the output surface of optical filter 64 and the input surface of image sensor 66, 2) simplifying the mechanical mounting of the optical filter 64, and 3) precluding the possibility of stray light from passing around the optical filter 64 before reaching the image sensor 66. In one example, the optical filter 64 is the MF445-45-9MM-SP from Thorlabs, Inc., of Newton, N.Y., USA, although other optical filters may be utilized.

Light that passes through the optical filter 64 then reaches the image sensor 66, which converts the image incident on it into an electronic signal that is subsequently converted to a digital format by the image digitizer 82. In one example, the image sensor 66 contains an array of photodiodes, each of which constitutes one pixel of the converted image. The image sensor 66 can have a resolution of between 250,000 and 25,000,000 pixels, although an image sensor 66 having VGA resolution (640×480 or 307,200 pixels) or SVGA resolution (800×600 or 480,000 pixels) provides a good trade-off between resolution and image processing complexity and time.

In this example, the image sensor 66 is a monochrome image sensor instead of a color image sensor because the image light incident on it is substantially monochromatic, although a color image sensor may be used in other examples. The frame rate of the image sensor 66 is between ten and 100 frames per second; slower frame rates may present a bottleneck to the measurement rate of the optical scanning system 30, while higher frame rates will unnecessarily increase the cost of the image sensor 66 with no system performance improvement because of other speed bottlenecks within the optical scanning system 30 such as the MEMS device 44 or the processing speed of the image processing algorithm being executed within the scan management computing device 84.

The size of the active area of the image sensor 66 can be between 1 mm×1.5 mm up to 10 mm×15 mm, although a size that is approximately the same as the envelope of the cross-hair scan area on the test surface 52 will drive the magnification of the telecentric lens to be approximately −1.0, which as noted earlier is a magnification for which lenses are easier to design, fabricate, and assemble. In one example, the image sensor 66 is the CMV300 from CMOSIS (Antwerp, Belgium), which has 488×648 (316,224) pixels across an active area that is 4.795×3.611 mm, although other image sensors may be utilized. The CMV300 also consumes only 700 mW of electrical power, so internal heating of the scan-head 31 can be minimized, has a 60 dB dynamic range, and the image digitizer 82 is integrated into it.

In another example, if the reticle 36 has an aperture that does not have arms like a cross-hair 35(1) (FIG. 5C) but instead has a central transmissive opening like a round or elliptical dot 35(2) (FIG. 5A), then a light detector such as a quadrant detector or a position sensing device ("PSD") may be used instead of an image sensor. By way of example only, the photosensor may be a PSD comprising a photodiode composed of a silicon chip with an electrode on each of its four sides. In this example, the amount of photocurrent output by an electrode is proportional to the proximity of the image spot on the PSD to the electrode. The PSD may have a 4 mm×4 mm active area. By way of example only, the PSD may be Model No. 2L4SP produced by On-Trak Photonics, although other types of photosensors may be utilized.

The quadrant sensor or PSD may be coupled to the scan management computing device 84 by a transimpedance amplifier and an analog to digital converter. The transimpedance amplifier amplifies the signals received from the quadrant sensor or PSD to a voltage compatible with the analog to digital converter. In one example, the transimpedance amplifier includes four input channels corresponding to each of the four electrodes on the PSD and two output channels corresponding to each axis. The analog to digital converter converts the analog voltages produced by the output channels of the transimpedance amplifier into a digital signal that may be read by the scan management computing device 84, although the analog to digital conversion may be performed directly by the local processor.

The housing 70 is used to enclose the components that comprise the scan-head 31. These internal scan-head 31 components can be mounted directly onto the housing 70, or some or all of the internal components can be mounted on frames or other subassemblies that are then attached to the housing 70. The housing 70 can be substantially cylindrical shaped, having a cross-sectional diameter of less than 25 mm, or preferably less than 18 mm, so that it can fit in narrow channels such as the space between the webs 92 of a crankshaft 90 as depicted in FIG. 8. The length of the housing 70 is relatively unconstrained when measuring a crankshaft 90, although other test objects 51 may present constraints in the length (X-axis) dimension, so the housing length should be kept to a minimum as well. By way of example only, the housing 70 may have a length under 250 mm, or less than 200 mm. The cross-section of the housing 70 has been described as being substantially circular, although it can be elliptical, rectangular, or even trapezoidal to facilitate accessibility of the scan-head 31 to a constrained location of a measurement surface 52.

The housing 70 is made from a rigid material such as aluminum or another metal, although a polymer or ceramic material may be utilized. In particular, materials having a low CTE, such as certain exotic ceramics or carbon fiber, will provide beneficial opto-mechanical stability of the internal scan-head components. One exemplary material for housing 70 is a carbon fiber tube, from DragonPlate, a division of Allred & Associates, Inc., of Elbridge, N.Y., USA. The DragonPlate carbon fiber material is available in a tube that has an inner diameter of 15.975 mm, which is large enough for the internal parts of the scan-head 31 to fit into, and an outer diameter of 18.415 mm, which is small enough to fit between the webs 92 of substantially all automotive crank shafts 90. Furthermore, carbon fiber material is typically black in color, which will beneficially absorb and reduce any spurious stray light that may exist within the housing 70.

The housing 70 has two window ports, one for first window 48 and another for second window 54. The two ends of the housing 70 are covered with end-caps (not shown), and the end-caps can have additional ports through which electrical wires can pass. The end-caps can also facilitate mounting of the scan-head 31 to its staging. In any event, all of the ports, windows, end-caps, etc. associated with the housing 70 must be sealed, such as hermetically by way of example, so the housing is air-tight as an air-tight housing 70 will prevent dirt, dust, oils, solvents, and other airborne contaminants from entering the housing 70 and fouling the optical components of the scan-head 31.

Referring now to FIG. 4, there are several electronic sub-systems of the optical scanning system 30 that may be located outside of the housing 70 of the scan-head 31. For instance, the LED driver 29, which is used to provide a nominal and steady amount of electronic current to the LED light source 29 is located outside of the housing 70 so the heat it generates does not warm up the scan-head 31. The LED driver 29 accepts an analog voltage commands signal from the D/A converter 27 which in turn accepts digital instructions from the scan management computing device 84, although the LED driver 29 could accept digital signals directly.

Since the output of the LED driver 29 is an electrical current, and its input is a voltage, the LED driver 29 is essentially a transconductance amplifier. The LED driver 29 supplies electrical current to the LED light source 32, from no current at all—in which case the LED light source 32 is Off—to an amount that is just below the damage threshold of the LED light source, which is typically several hundred milli-Amps. In this particular example, the LED driver 29 is a single chip solution, such as the LED/Laser diode driver IC-WKN manufactured by iC-Haus of Bodenheim, Germany, although other types and/or numbers of other drivers may be utilized.

The scan management computing device 84 is a highly integrated microcontroller device with a variety of on-board hardware functions, such as analog to digital converters, serial buses, general purpose I/O pins, RAM, and ROM, although the scan management computing device 84 can be a personal computer, a digital signal processor (DSP), or even an FPGA (field programmable gate array). Furthermore, any or all of the D/A converters 27, 79V, and 79H can be integrated into the hardware of the scan management computing device 84.

The scan management computing device 84 in the optical scanning system 30 executes a program of stored instructions for one or more aspects of the present technology as described and illustrated by way of the examples herein, although other types and/or numbers of processing devices and logic could be used and the local processor could execute other numbers and types of programmed instructions. In another embodiment, the scan management computing device 84 may be located separate from the optical scanning system 30. The scan management computing device 84 may further communicate with other computing devices, such as through a serial data bus, although the scan management computing device 84 may communicate over other types and numbers of communication networks.

The scan-head 31 of optical scanner 30 is adapted to fit between the pins of a crank shaft 90. As shown in FIG. 6, the crank shaft 90 has pin journals 95 having journal surfaces 94, main journals 98, webbing 92 that connects the main journals 98 and the pin journals 95, and counterweights 96. A crank shaft 90 design typically has scores of critical dimensions (linear, angular, surface, and spatial) and tolerances, and each of these dimensions need to be accurately measured.

Referring to FIG. 7, it is shown that a pin journal 95 of the crank shaft 90 can have a stress-relieving undercut 97 where the pin journal 95 interfaces with the webbing 92. The radius of the stress-relieving undercut 97 is a critical-to-function dimension of crank shaft 90, and it is shown in FIG. 8 how the scan-head 31 can be positioned between the webbing 92 and angularly oriented so that the radius of the stress-relieving undercut 97 can be measured.

Figure 13:
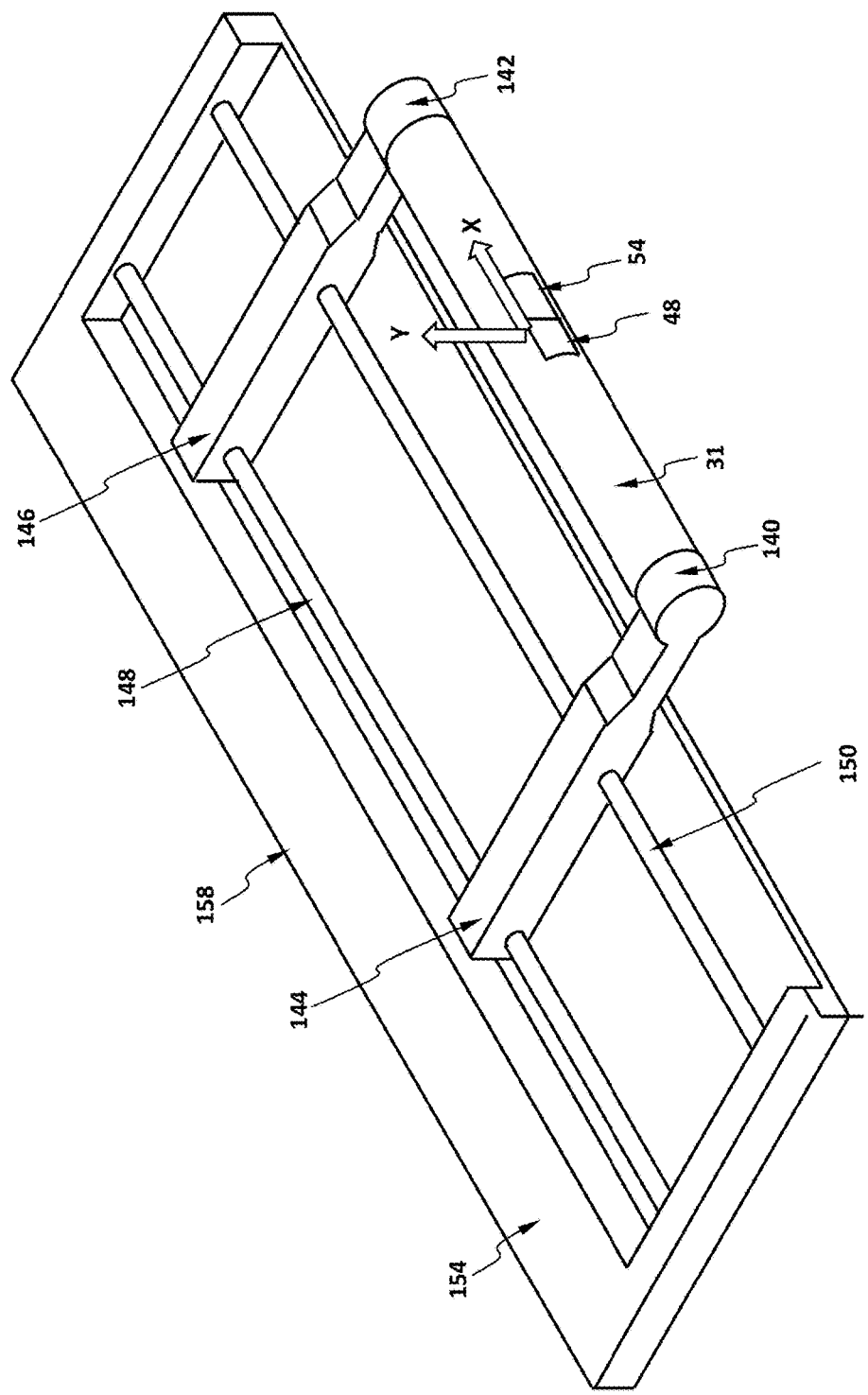
FIG. 13 is a diagram that illustrates how the 3D scanner can be attached to a mount.

Referring now to FIG. 13, one method of mounting and staging of the scan-head 31 is shown. In FIG. 13, scan-head 31 is mounted on a left rotary stage 140 and a right rotary stage 142, which together control the angular orientation about the X-axis. Left rotary stage 140 is attached to left stage mount 144 and right rotary stage 142 is attached to right stage mount 146. A rear lead screw 148 and front lead screw 150 pass through and are coupled with the left stage mount 144 and the right stage mount 146 so that as the rear lead screw 148 and the front lead screw 150 are synchronously rotated the left stage mount 144, the right stage mount 146, and the scan-head 31 are translated along the X-axis. The rear lead screw 148 and the front lead screw 150 are coupled to lead screw motors (not shown) which in turn are mounted on a stage platform 154 that has a mounting surface 158, which in turn can be mounted to another stage for additional degrees of rotational or translation motion of the scan-head 31 about the test object 51, although other mounting configurations may be utilized.

While the telecentric lens can be manufactured and assembled to very tight tolerances, in practice the magnification, distortion, and residual non-telecentricity properties of the lens must be measured and calibrated so these effects can be removed from the images. All three of these lens properties can be characterized using the microdisplay 130 having a pixelated display 132 on which a calibration pattern can be shown.

Figure 14:
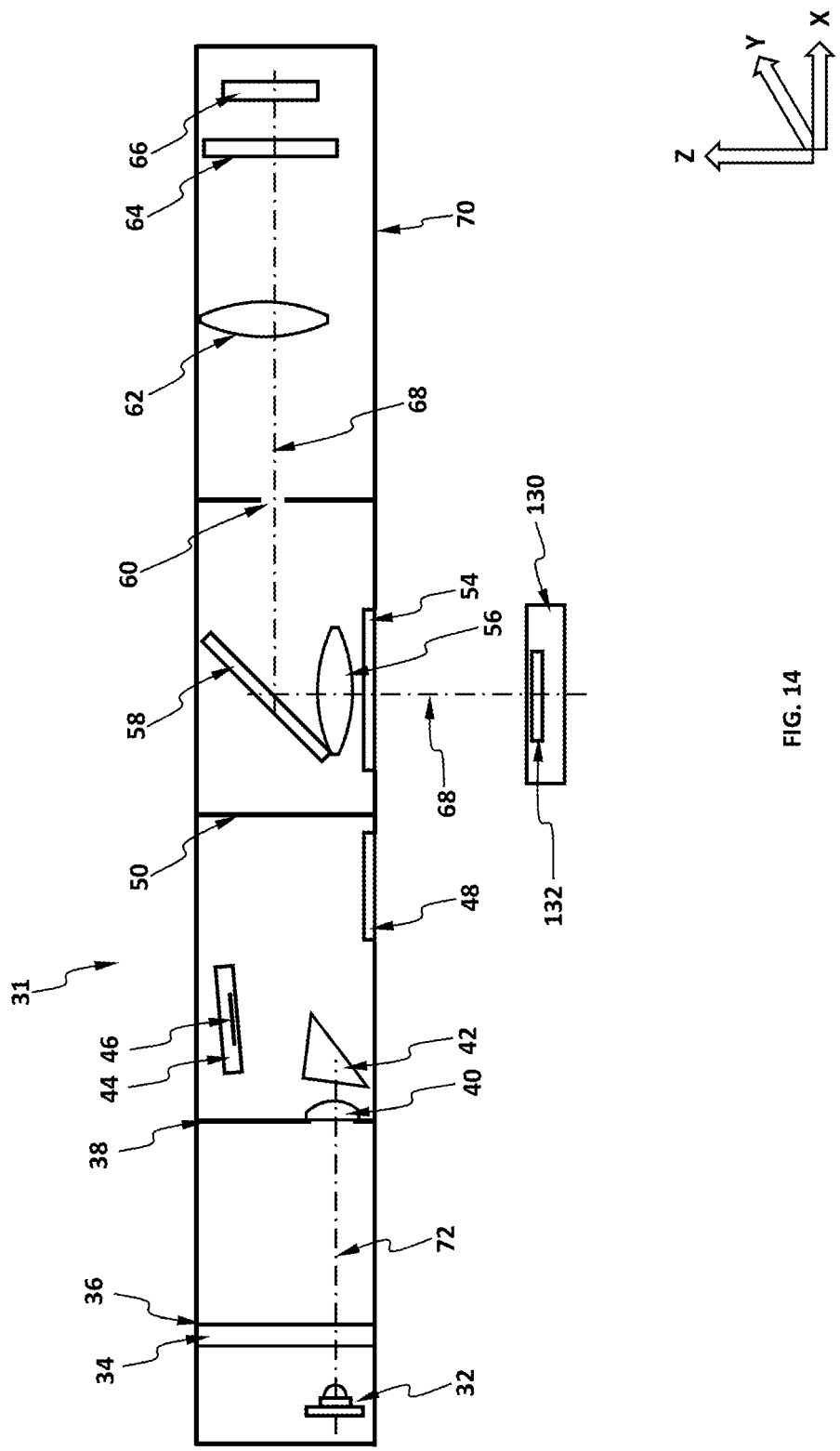
FIG. 14 is a diagram that illustrates how the telecentric lens of a 3D scanner can be calibrated.

In an exemplary calibration method, as seen in FIG. 14, the microdisplay 130 is placed below the scan-head 31, substantially centered on optical axis 68 of the telecentric lens, during the calibration process. To calibrate the telecentric lens, a pattern of dots, such as a square pattern, is shown on the pixelated display 132, and an image is subsequently presented on the image sensor 66 which is then read out and processed by the scan management computing device 84. By knowing the size of the box on the pixelated display 132 and by calculating the size of the box image on the image sensor 66, the magnification of the telecentric lens can be computed by scan management computing device 84.

By changing the size of the box pattern shown on the pixelated display 132, and by calculating the change in size of the box pattern on the image sensor, the optical distortion of the telecentric lens can be computed by the scan management computing device 84. Finally, by changing the distance between the pixelated display 132, and the scan-head 31 (in the Z direction) and by calculating the change in the size of the box pattern on the image sensor 66 (keeping the box image on the pixelated display constant), the non-telecentricity of the telecentric lens can be computed by the scan management computing device 84.

Figure 15A:
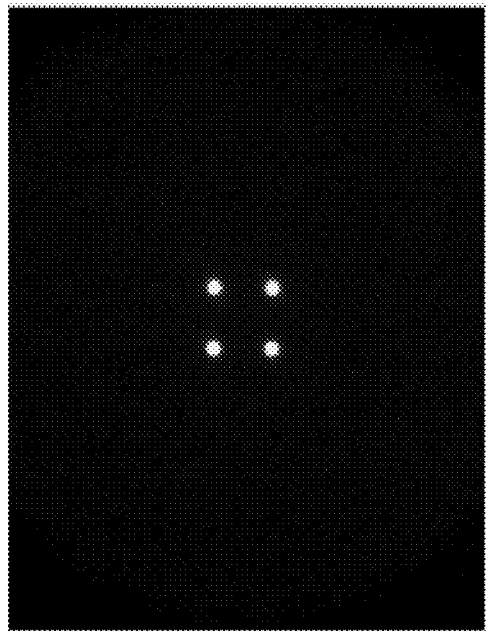
FIGS. 15A, 15B, and 15C are images of the calibration dots captured with the configuration illustrated in FIG. 14.
Figure 15B:
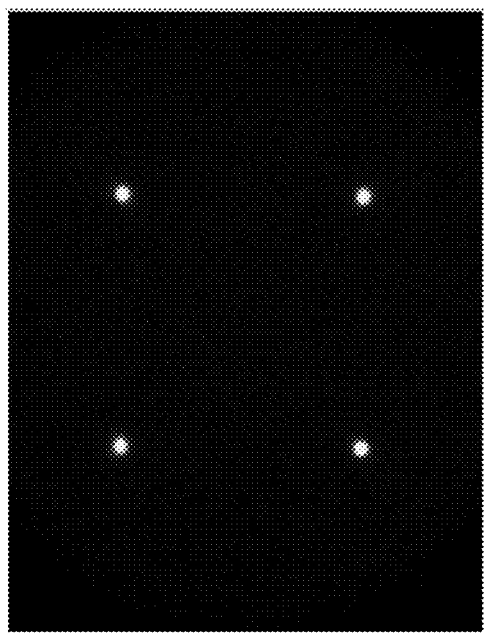
Figure 15C:
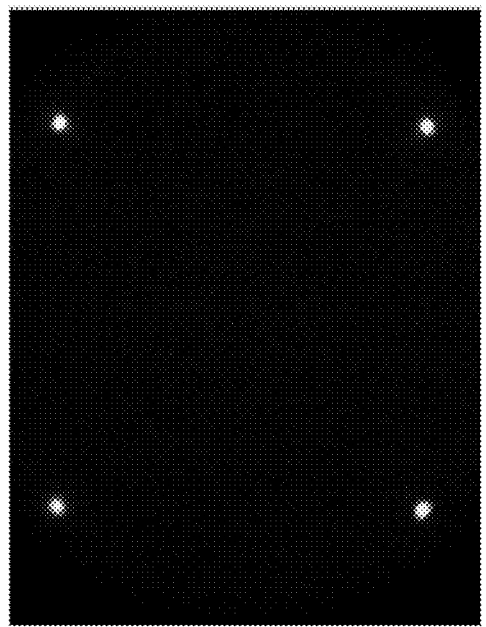

During calibration, the pattern displayed on the pixelated display 132 can include an array of dots, ellipses, lines, or an arrangement of nearly any pattern depicted in FIG. 5A through 5M. FIG. 15A shows the image on the image sensor 66 of an array of spots (akin to the dot of FIG. 5A) arranged in a square, while FIG. 15B and FIG. 15C show similar images in which the size of the square has been increased a known amount. In this way the magnification and distortion of the telecentric lens can be measured. Repeating the process at varying (and known) heights of the pixelated display 132 allows the non-telecentricity properties of the telecentric lens to be determined. One example microdisplay 130 that may be used for calibration is the Ruby SVGA color microdisplay from Kopin, Corp. of Westborough, Mass., USA, although other microdisplays may be utilized.

In one example, the test object 51 can be rigidly mounted and scan-head 31 can be mounted to staging devices as described in connection with FIG. 13 to facilitate the positioning of the scan-head 31 in a location where the surface 51 can be scanned and measured. Alternately, the test object 51 can be mounted to rotational and/or translational stages as described below in connection with FIG. 16, and the scan-head 31 can be rigidly fixed in position, or both the test object 51 and the scan-head 31 can be mounted on various translational and rotational stages to accommodate the required test geometry. If the scan-head 31 is mounted on high quality staging, then it is possible to replace the MEMS device 44 and its MEMS mirror 46 with a rigid mirror, and emulate the MEMS scanning operation by moving the scan-head 31 as a whole with its staging. Alternately, if the test object 51 is mounted on high quality staging, such as that obtained with interferometric gauging and feedback, then it is possible to replace the MEMS device 44 and its MEMS mirror 46 with a rigid mirror, and emulate the MEMS scanning operation by moving the test object 51 with its staging.

Figure 16:
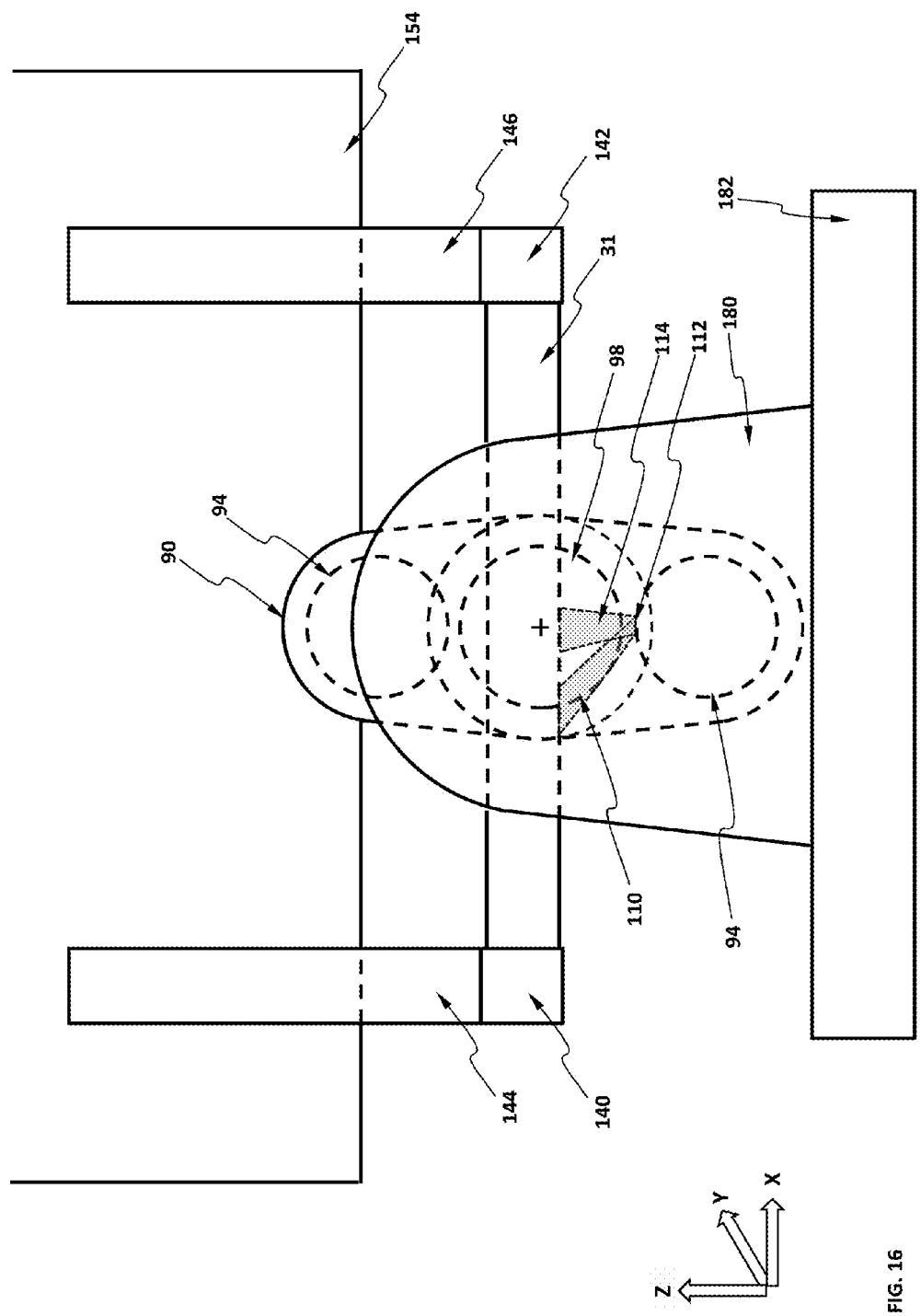
FIG. 16 is a diagram that illustrates how a test object, such as a crank shaft, can be mounted for translational and rotational positioning.

One possible staging for the test object 51 is illustrated in FIG. 16 in which the test object is the crank shaft 90. As shown in FIG. 16, the scan-head 31 is mounted on the left rotary stage 140 and the right rotary stage 142 which provides angular orientation of the scan-head 31 about its X-axis. The scan-head 31 is shown emitting projected light 110 onto illumination location 112, and reflected light 114 is shown re-entering the scan-head. Crank shaft 90, having pin journals 94 and main journal 98 is mounted about its axis onto a rotational stage 180 which rotates the crank shaft about the Y-axis. The rotational stage 180 is also shown mounted onto a translational stage 182 which can translate the crank shaft 90 in any or all of the X, Y, and directions. If the translational stage 182 has good accuracy and repeatability, such as that obtained with interferometric gauging and feedback, then the translational stage 182 can cause the crank shaft 90 to scan across field-of-view of the scan-head 31, and the scanning MEMS mirror 46 can be replaced with a mirror that is rigidly mounted within the housing 70 of the scan-head 31.

Figure 18:
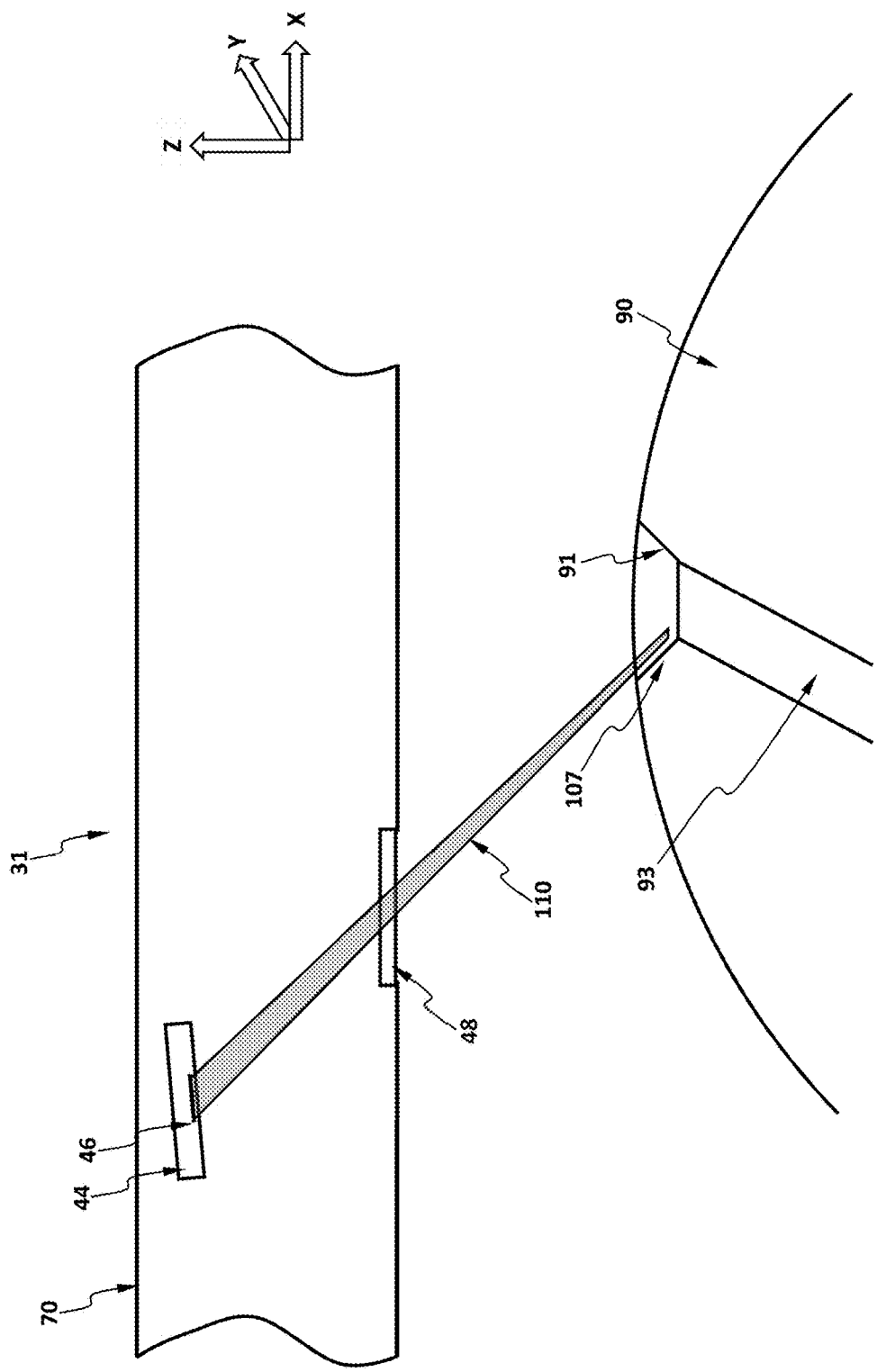
FIG. 18 is a diagram that illustrates a crank shaft oil-hole chamfer measurement with an embodiment of the 3D optical scanner.

One feature common to most crank shafts 90, especially automotive crank shafts, is the oil hole 93, which is a hole that is drilled in the cranks shaft between a main journal 98 and a pin journal 94 to facilitate the flow of lubricating oil between their surfaces. As shown in FIG. 18, an oil hole 93 drilled through the journal of a crank shaft 90 also has a conical chamfer 91 where the oil hole 93 intersects the journal surface. Chamfer 91 also facilitates the flow of oil, but also eliminates must burrs that result from the oil-hole-drilling operation. Like most features on a crank shaft 90, the depth, width, and placement of chamfer 91 must be measured.

However, as further illustrated in FIG. 18, projected light 110 is substantially parallel to the near edge 107 of chamfer 91, which precludes the possibility of measuring the near edge 107 surface with the scan-head 31. One remedy is to measure as much of the topography of chamfer 91 as possible and then flip the scan-head 31 180 degrees about the Z-axis and then re-measure as much of the chamfer 91 as possible, and then stitch the two incomplete topographical views together to obtain a complete topographical profile of chamfer 91. However, the scan-head 31 flipping operation requires additional wide-angle staging which can be expensive, and topographical stitching algorithms can be problematic and inaccurate.

Figure 19:
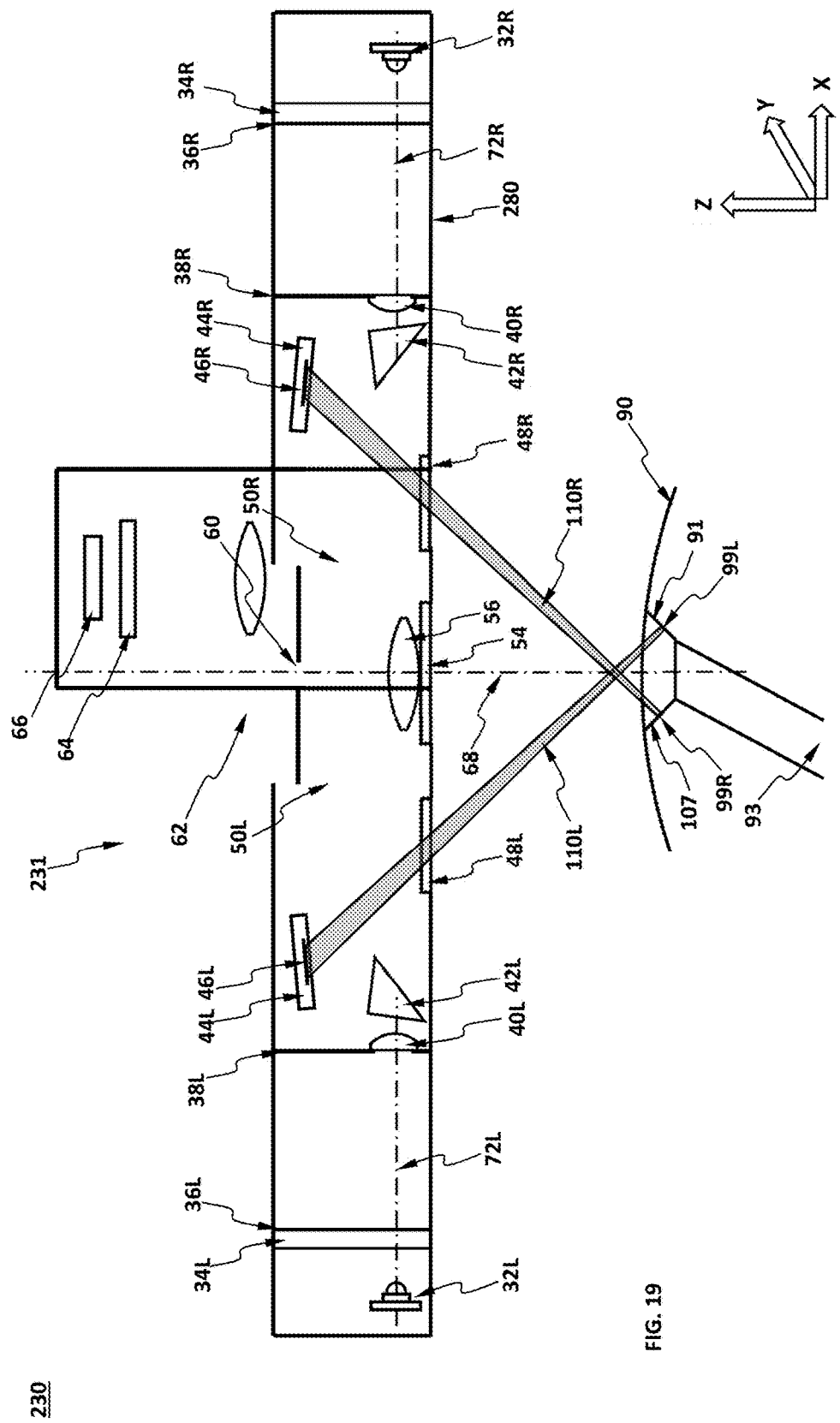
FIG. 19 is a diagram that illustrates a crank shaft oil-hole chamfer measurement with an alternate embodiment of the 3D optical scanner.

An alternate way of measuring the entire surface profile of oil-hole chamfer 91 is illustrated in FIG. 19. In the scan-head 231 embodiment shown in FIG. 19, there are two source arms—a right source arm and a left source arm—and a single imaging arm that lies along a single optical axis 60 because the fold mirror 58 has been eliminated. The left source arm of scan-head 231 is substantially the same as the source arm of scan-head 31 as described earlier, while the right source arm of scan-head 231 is a mirror image of its left source arm. Note this configuration will also require an additional set of MEMS drivers (80V and 80H in FIG. 4) and an additional LED light source driver (29 in FIG. 4) with accompanying D/A converters. With this configuration, the oil-hole chamfer 91 can be entirely illuminated projected light 110L and projected light 110R as no part of chamfer 91 will be parallel to both beams of projected light.

Figure 20:
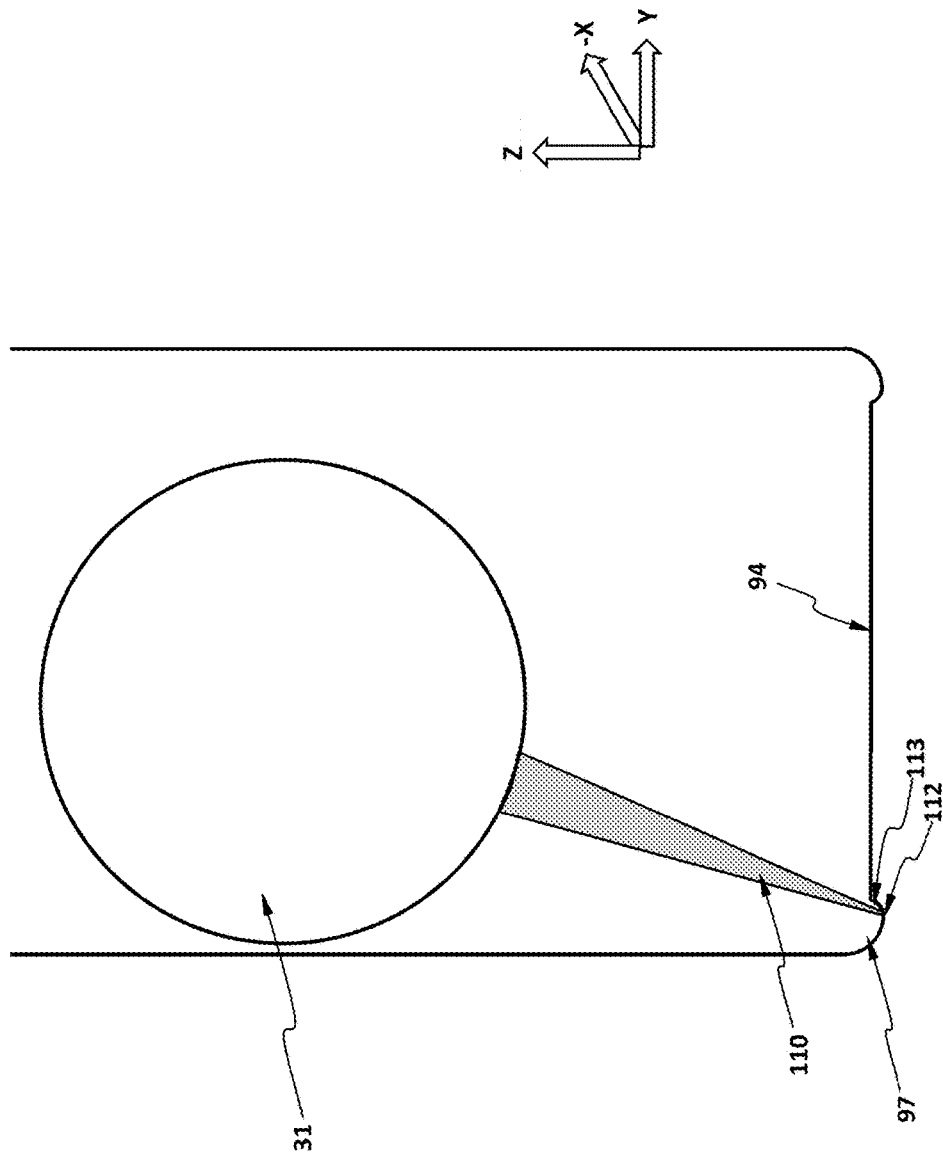
FIG. 20 is a diagram that illustrates a crank shaft undercut measurement with an embodiment of the 3D optical scanner.

Another feature common of many crank shafts 90, especially automotive crank shafts, is the undercut 97. As illustrated in FIG. 20, projected light 110 emitted by the scan-head 31 is incident on the undercut 97 at illumination location 112. However, projected light 110 can be substantially parallel to the in-board surface 113 of undercut 97, or the in-board-surface 113 of undercut 97 can be in the shadow of surface 94. Furthermore it is not possible to re-position the scan-head 31 into a location that allows in-board surface 113 to be illuminated, scanned, and measured.

Figure 21:
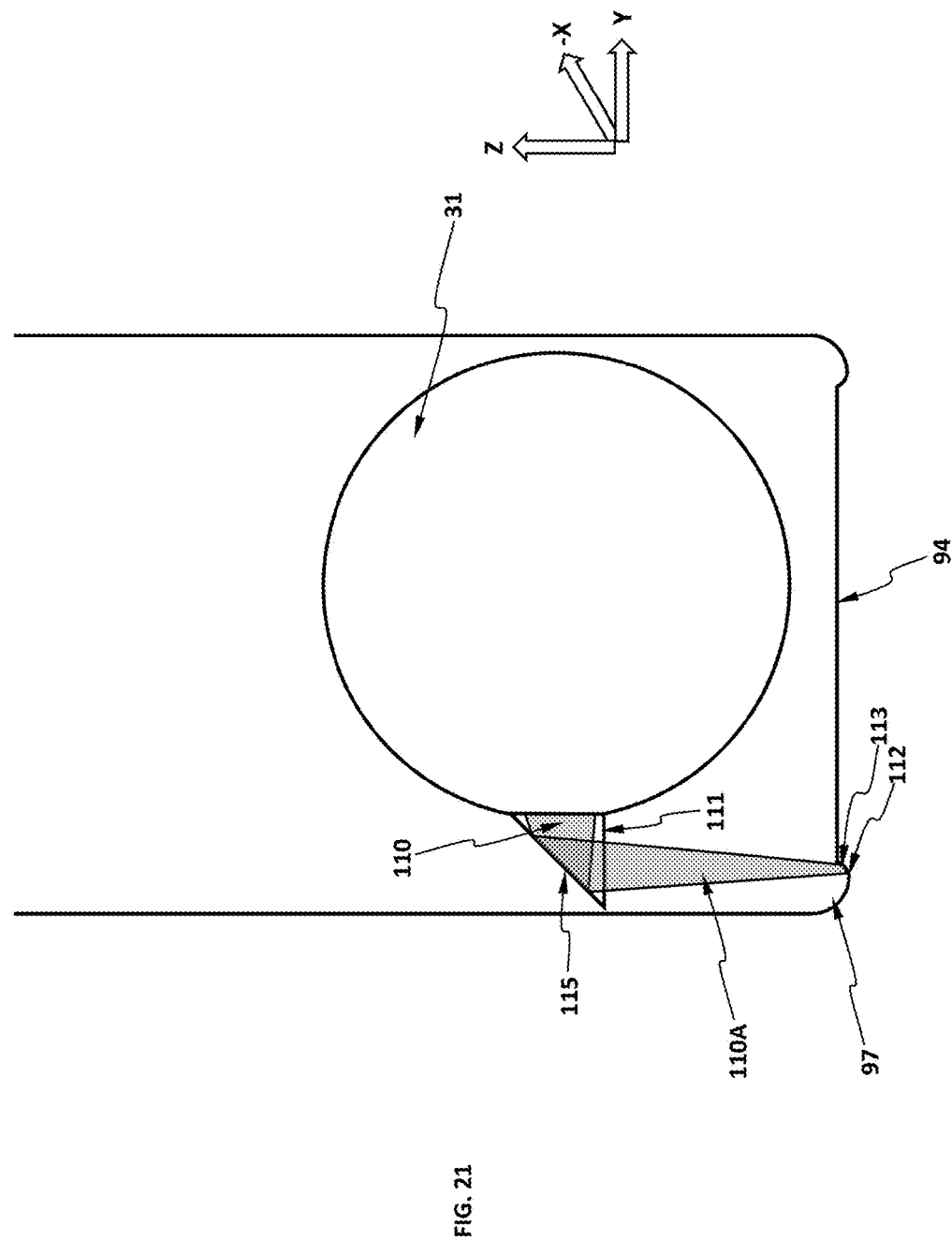
FIG. 21 is a diagram that illustrates a crank shaft undercut measurement with an alternate embodiment of the 3D optical scanner.

An alternate way of measuring in-board surface 113 of undercut 97 is illustrated in FIG. 21. In the example shown in FIG. 21, a right angle prism 111 has been bonded to the first window 48 and the second window 54 in such a way that the projected light 110 TIRs from the hypotenuse of the prism 111. The reflected projection light 110A is then directed to the undercut 97, and in-board surface is no longer in the shadow of surface 94, nor is in-board surface 113 close to being parallel to the reflected projected light 110A. One variation on this example is to not bond the right angle prism 111 onto the first window 48 and the second window 54, but instead to eliminate the windows and install right angle prism 115 in their place. To eliminate light coupling through the right angle prism 115 from the source arm to the imaging arm, right angle prism 115 can be separated into two prisms, one placed at the location of the first window 48 and a second placed at the location of the second window 54.

Figure 9:
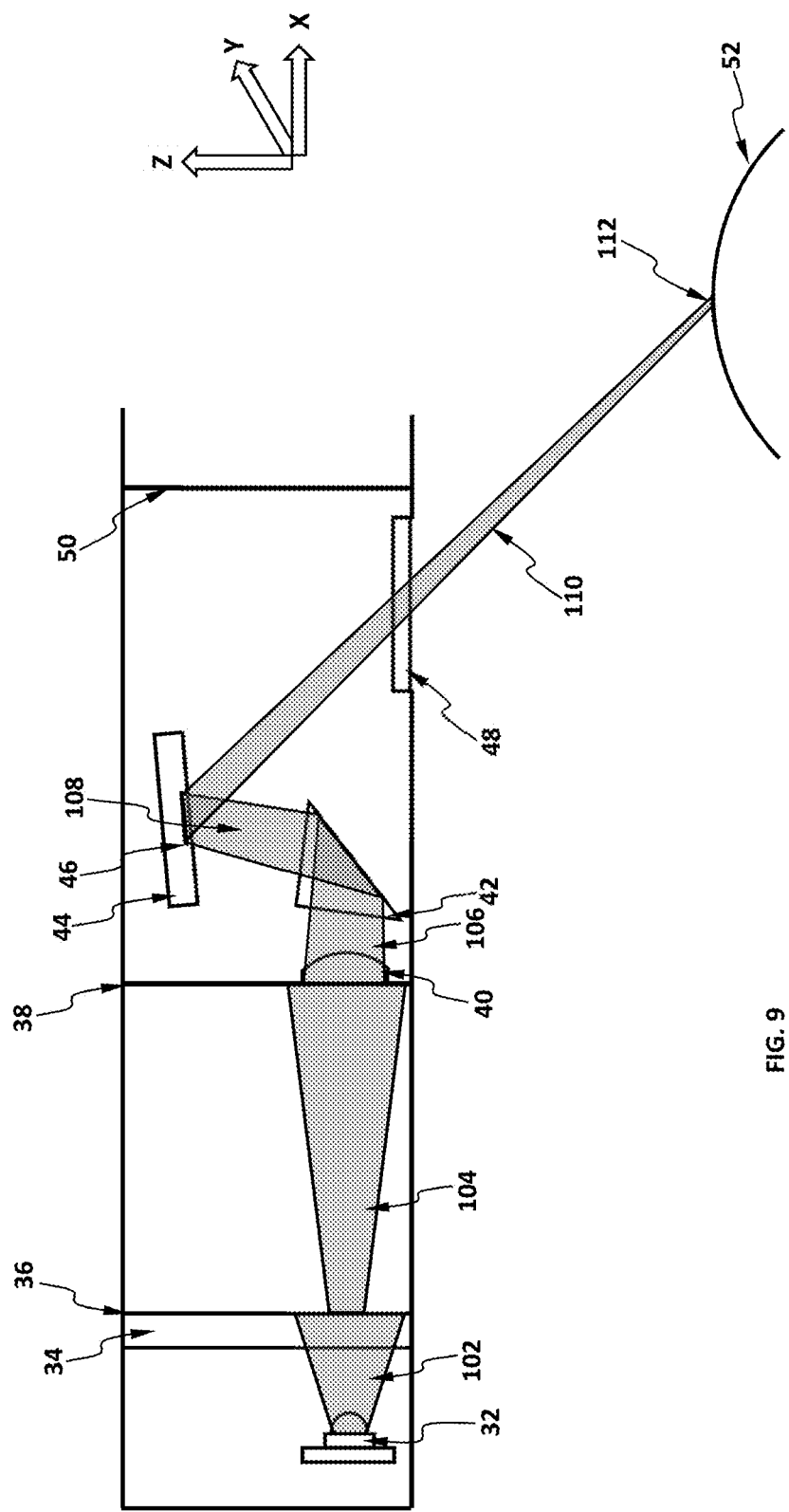
FIG. 9 is a ray diagram of an example of the three-dimensional optical scanner that illustrates the propagation of the rays in the source arm of the scanner.

An exemplary operation of the optical scanning system 30 will now be described with reference to FIGS. 4, 9, and 10. To commence a 3D surface profile measurement, the scan management computing device 84 provides one or more instructions to the translation stages 76 and the rotation stage 78 to locate the scan-head 31 in a measurement position adjacent to the test surface 52 to be measured. The test object 51 is also installed in its staging and oriented to facilitate the placement of the scan-head 31 for optimal measurement of test surface 52.

There are three modes of measurement operation: 1) the MEMS mirror 46 causes the projected light 110 to scan across the test surface 52; 2) the projected light 110 is substantially stationary and the test object 51 is moved by virtue of its staging (180 and 182 in FIG. 16) so that the test surface 52 is equivalently scanned under the stationary projected light; or 3) both the test object 51 and the projected light 110 are stationary, and measurement of the profile of the test surface 52 is accomplished by processing the image of the reticle pattern that is projected onto the test surface 52 in the projected light 110. In general, the two scanning measurement modes will yield higher resolution surface measurements of higher accuracy, while the non-scanning mode is much less costly to implement.

In MEMS mirror 46 scanning mode, after the test object 51 is properly positioned and the scan-head 31 is in its measurement position, the scan management computing device 84 issues one or more instructions to the D/A converter 27, which in turn issues an analog electronic signal to the LED driver 29 to provide the light source 32, such as an LED, with electrical power at which point the light source 32 begins to emit light 102.

The emitted light 102 is then incident on and critically fills or overfills the transmissive pattern of the reticle 36. Transmitted light 104 is that light which passes through the reticle 36, and has a pattern, such as those of FIGS. 5A through 5M by way of example, encoded in it such that the pattern can be discerned at a downstream image on the test surface 52. Transmitted light 104 critically fills or overfills the lens aperture 38; transmitted light 104 that passes through the elliptical aperture 38 is then incident on the projection lens 40. The projection lens 40 creates a projected image of the pattern in the reticle 36 on the test surface 52.

Substantially all of the light 106 that exits through projection lens 40 is incident on a short side of the right angle prism 42. The light 106 then refracts through the first short side of the right angle prism 42 and enters the prism whereupon it becomes incident on the hypotenuse of the right angle prism 42. Light that is incident on the hypotenuse of the right angle prism 42 is reflected in a TIR process, and is reflected onto the second short side of the right angle prism 42, whereupon it refracts through the second short side as prism light 108.

The prism light 108 is then incident on the MEMS mirror 46 for scanning the projected light 110 in this example, although a stationary mirror may be utilized in other examples where the projected light 110 is stationary. The prism light 108 underfills the MEMS mirror 46 as any light that misses the MEMS mirror 46 will be incident on the MEMS device 44 and will be reflected as stray light and degrade the quality of the reticle image projected onto test surface 52. The aperture 38 is sized and located to ensure the prism light 108 underfills the MEMS mirror 46.

In this example where the projected light 110 scans across the test surface 52, the scanning is accomplished by rotations of the MEMS mirror 46. For scanning of the projected light 110, scan management computing device 84 issues one or more digital instructions to one or both of the D/A converters 79V and 79H, which then output analog electronic signals that are routed to inputs of the vertical MEMS mirror driver 80V and the horizontal MEMS mirror driver 80H, respectively. Changes in these analog electronic signals cause the output voltages of the vertical MEMS mirror driver 80V, and the horizontal MEMS mirror driver 80H, to change accordingly, and since these output voltages are coupled to the electrostatic actuator of the MEMS device 44, the MEMS mirror 46 will rotate about its vertical and horizontal axes in correspondence to the voltages. In this way, the angular orientation of MEMS mirror 46 is varied under the control of the scan management computing device 84.

The MEMS mirror 46 causes the stationary prism light 108 to be reflected into scanning projected light 110. The projected light 110 then passes through the first window 48 and substantially comes to a focus at an illumination location 112 on the test surface 52. That is, the MEMS mirror 46 causes the projected pattern of the reticle 36 to be scanned across the test surface 52 during the surface measurement process. In another example, where the projected light 110 is non-scanning and stationary, the projected pattern of the reticle 36 is stationary in space as well (assuming the scan-head 31 is stationary in space also).

It is possible that the right angle prism 42 could be excluded from the source arm of the scan-head 31, and the angular position of the MEMS device 44 could be changed to accommodate the different angle of incidence of the light 106. However, as will become apparent later in connection with FIG. 11, it is highly desirable that the input light incident on the MEMS mirror 46 be as normal as possible as this will reduce the rotational swing in the θ angle that the MEMS mirror 46 will need to undergo in order to produce a nominal scan pattern width at the test surface 52. Inclusion of the right angle prism 42 allows the light 106 to be directed upward into a direction that is only a few tens of degrees from normal when it is incident on the MEMS mirror 46; without the right angle prism 42 the light incident on the MEMS mirror 46 will be 70° to 80° from normal, and the MEMS mirror 46 will have to rotate over much greater angles to achieve the same scan envelope on the test surface 52.

Figure 17A:
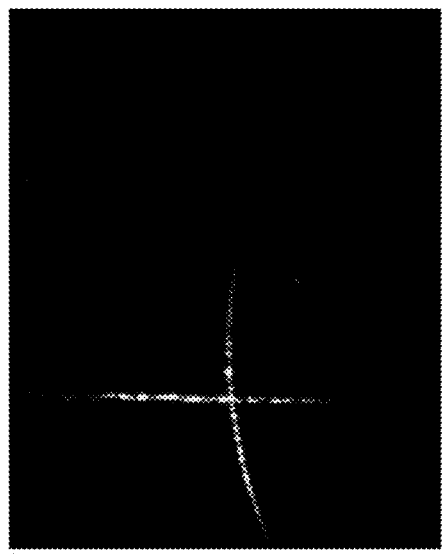
FIGS. 17A, 17B, and 17C are three views of the projected cross-hair on a concave test surface with three different scan positions of the mirror angle θ.
Figure 17B:
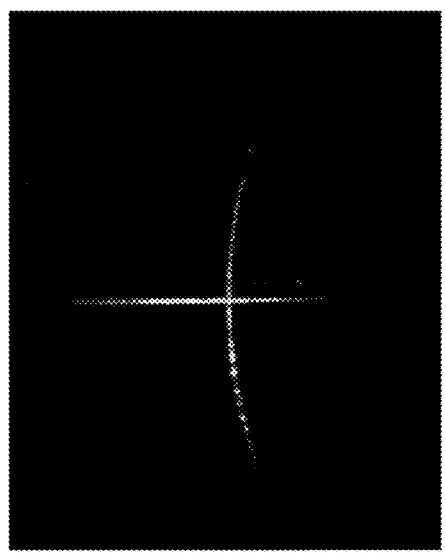
Figure 17C:
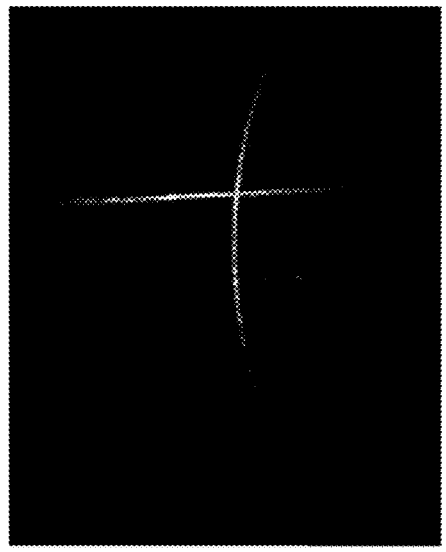

In this example, the pattern of the reticle 36 is the cross-hair pattern illustrated in FIG. 5C, although any of the other patterns illustrated may be utilized. If the test surface 52 is planar, the image of the cross-hair pattern will also be a cross-hair in which the cross-hair arms are straight and undistorted. Indeed, in this situation the image of the cross-hair is essentially the same as the cross-hair aperture of the reticle 36, and only varies by the magnification of the optical system defined by the projection lens 40, which can be between −0.4 and −4.0, by way of example only. However, if the test surface 52 is an undercut 97, for example, then the projected cross-hair image will be distorted in accordance with the curvature of the undercut 97. FIGS. 17A, 17B, and 17C are images of a cross-hair projected onto the undercut 97, in which the MEMS mirror 46 was rotated −1.0°, 0.0°, and 1.0° in its θ direction. As shown in FIGS. 17A, 17B, and 17C, the horizontal arc of the cross-hair is curved in accordance with the curvature of the test surface 52; the greater the curvature of test surface 52, the greater curvature present in the horizontal cross-hair. Indeed, computing the degree of curvature in the cross-hair allows for the computation of the curvature of the test surface 52, without the need for scanning.

Light at the illumination location 112 on the test surface 52 is subsequently reflected from the test surface as reflected light 114. A portion of the reflected light 114 is incident on and passes through the second window 54 where it then becomes incident on the first lens element 56. The first lens element 56 then refracts and transmits reflected light into light 116 which is then incident on the mirror 58. The mirror 58 then reflects the light 116 into a substantially longitudinal direction along optical axis 68, whereupon it then encounters the aperture stop 60.

In this example, the mirror 58 is installed and placed at a 45 degree angle so the image light of the telecentric lens is reflected 90 degrees, and into a direction that is substantially parallel to the axis of the scan-head 31. In this way, the scan-head 31 does not extend inordinately far into the Z-axis and the scan-head 31 can be made small and compact such that it can fit into tight recesses of the test object 51. Reflected light 118 contains a wide variety of rays including those that are highly aberrated and those that are non-telecentric. The aperture stop 60 blocks the majority of these undesirable rays so they do not reach the downstream image plane of the image sensor 66, and therefore these undesirable rays will not degrade the quality of the image of the cross-hairs formed on the image sensor 66.

Light rays 120 that pass through the aperture of the aperture stop 60 are then incident on the second lens element 62 which again refracts and transmits the light, and outputs a light bundle 122. The light bundle 122 can now also be telecentric, and is incident on the optical filter 64 which blocks light rays in the light bundle 122 that have a wavelength other than that emitted by the light source 32. In this way, any stray light from, for example, overhead room lighting, that enters the scan-head 31 through the second window 54 will be substantially blocked by the optical filter 64 and prevented from reaching the downstream image plane of the image sensor 66, and therefore these undesirable rays will not degrade the quality of the image of the cross-hairs formed on the image sensor 66.

Light rays of the light bundle 122 that pass through the optical filter 64 are then incident on the image sensor 66, whereupon a high quality image of the cross-hair image formed on test surface 52 is formed on the image sensor 66. The image sensor 66 then converts the optical image formed on its input face into an electronic representation of the image, and outputs it to the image digitizer 82 then converts it to a digital format which is then routed to an input of the scan management computing device 84. The scan management computing device 84 then either computes the location where the arms of the cross-hair intersect for scanning measurement methods, or analyzes the curvature of the arms of the cross-hair to determine the curvature of the test surface 52 for non-scanning methods of measurement.

For scanning examples, the scan management computing device 84 next provides instructions for either the MEMS mirror 46 to rotate to its next scan position (through the D/A converters 79V and 79H and through the vertical and horizontal MEMS drivers 80V and 80H) or it provides one or more instructions for the test object to be moved to its next measurement position through the translation stage 76 and/or the rotation stage 78. This step-and-repeat process is repeated until the entire test surface 52 of test object 51 has been scanned.

A key component of the present technology is the calculation of the location of the 3D test point on the test surface 52 from knowledge of the location of the cross-hair crossing point on the image sensor 66 and knowledge of the angular orientation of the scanning MEMS mirror 46. This will now be explained with reference to FIG. 11 and FIG. 12.

Figure 11:
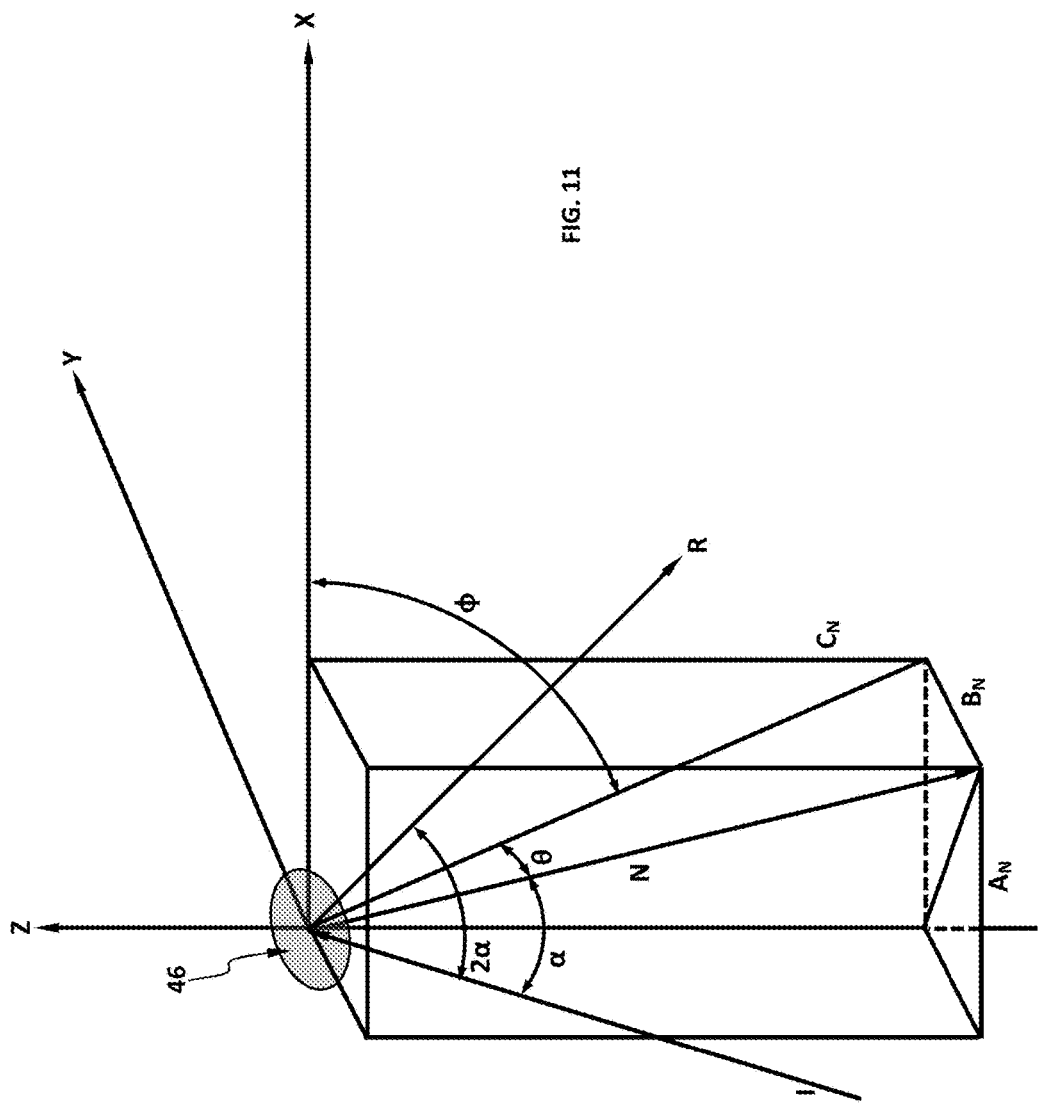
FIG. 11 is a diagram that illustrates the geometry of the light as it reflects from the scan mirror in the source arm of the scanner.

FIG. 11 illustrates the geometry of the light rays as they reflect from the MEMS mirror 46. Of particular interest are vector I which represents the light 108 exiting the right angle prism 42 and incident on the MEMS mirror 46, vector N which is normal to the surface of the MEMS mirror 46, and vector R which represents the projected light 110 reflected from the MEMS mirror 46. Also defined in FIG. 11 is $A_N$, the direction cosine of vector N along the X-axis, $B_N$, the direction cosine of vector N along the Y-axis, and $C_N$, the direction cosine of vector N along the Z-axis. Also defined in FIG. 11 is angle $\alpha$ which is the angle between vector I and vector N, angle $\theta$ which is the angle of rotation of the MEMS mirror 46 about the vertical axis of the MEMS device 44, which in turn is rotated about the Y-axis from the Z-axis, and $\phi$, which is a rotation of the MEMS mirror 46 about the Y-axis.

The MEMS mirror 46 angles $\theta$ and $\phi$ are known a priori by the optical scanner 30 by virtue of calibration knowledge of the MEMS device 44 and by knowledge of the actuating voltages applied to the MEMS device 44 by the horizontal driver 80H and the vertical driver 80V. From this knowledge, the direction cosines of the MEMS mirror 46 normal vector, $A_N$, $B_N$, and $C_N$ can be computed, and the location (i.e., where the hairs of the cross-hair image cross) of the cross-hair on the test surface 52 can be computed with input from the measured location (i.e., where the hairs of the cross-hair image cross) of the cross-hair on the image sensor 66.

Note that vector I has direction cosines $A_I$, $B_I$, and $C_I$, and vector R has direction cosines $A_R$, $B_R$, and $C_R$. Vector I, representing the light ray incident on the MEMS mirror 46, lies substantially in the X-Z plane, so $B_I$ is zero and will be dropped from consideration in the following analysis. If $\phi_I$ represents the angle vector I makes with the Z-axis (typically 10°), then $A_I=\sin(\phi_I)$ and $C_I=\cos(\phi_I)$. Note the origin of the coordinate system is where vectors I, N, and R intersect at the center of the MEMS mirror 46. Also note the magnitude of vector I is 1.0, and the magnitude of vectors N and R are also 1.0 as well. By inspection, the direction cosines of vector N are: $A_N=\cos(\theta)\sin(\phi)$, $B_N=\sin(\theta)$, and $C_N=-\cos(\theta)\sin(\phi)$.

At this point in the analysis the components of vector I and vector N are known and the components of vector R must be determined. There are two constraints on vector R that provide for its computation: 1) the angle $\alpha$ between vector I and vector N must be the same as the angle between vector N and vector R. In other words, their dot products must be the same: $I \cdot N = N \cdot R$. Secondly, all three vectors I, N, and R, must lie in the same geometrical plane, this geometrical plane being defined by its normal vector P, which can be found by a cross product of any two vectors. In other words vector $P=I \times N$ and $P=N \times R$, and therefore $I \times N=N \times R$. Restating the dot product equation, $I \cdot N=N \cdot R$, in terms of the components of the vectors provides $A_I A_N + C_I C_N = A_R A_N + B_R B_N + C_R C_N$. Solving for $C_R$, $C_R=(A_I A_N + C_I C_N - A_R A_N - B_R B_N)/C_N$. The components of vector P from $P=N \times R$ are $A_P=B_N C_R - B_R C_N$, $B_P=A_R C_N - A_N C_R$, and $C_P=A_N B_R - A_R B_N$. Similarly the components of vector P from $P=I \times N$ are $A_P=-B_N C_I$, $B_P=A_N C_I - A_I C_N$, and $C_P=A_I B_N$. Note that the three components of P found from the two different cross products must be the same. Setting the two $C_P$ equations equal provides $A_N B_R - A_R B_N = A_I B_N$ from which $A_R=(A_N B_R - A_I B_N)/B_N$. Likewise setting the two $A_P$ equations equal provides $A_P=B_N C_R - B_R C_N=-B_N C_I$, from which $B_R=(B_N C_I - B_N C_R)/C_N$.

Plugging the equations for $A_R$ and $B_R$ into $C_R$, and simplifying, provides $C_R=A_I A_N C_N + C_I C_N^2 - A_N^2 C_I + A_N A_I C_N - B_N^2 C_I$. This result can then be plugged into the equation for $B_R$, whose result can be plugged into the equation for $A_R$ to find these final two components of vector R.

Figure 12:
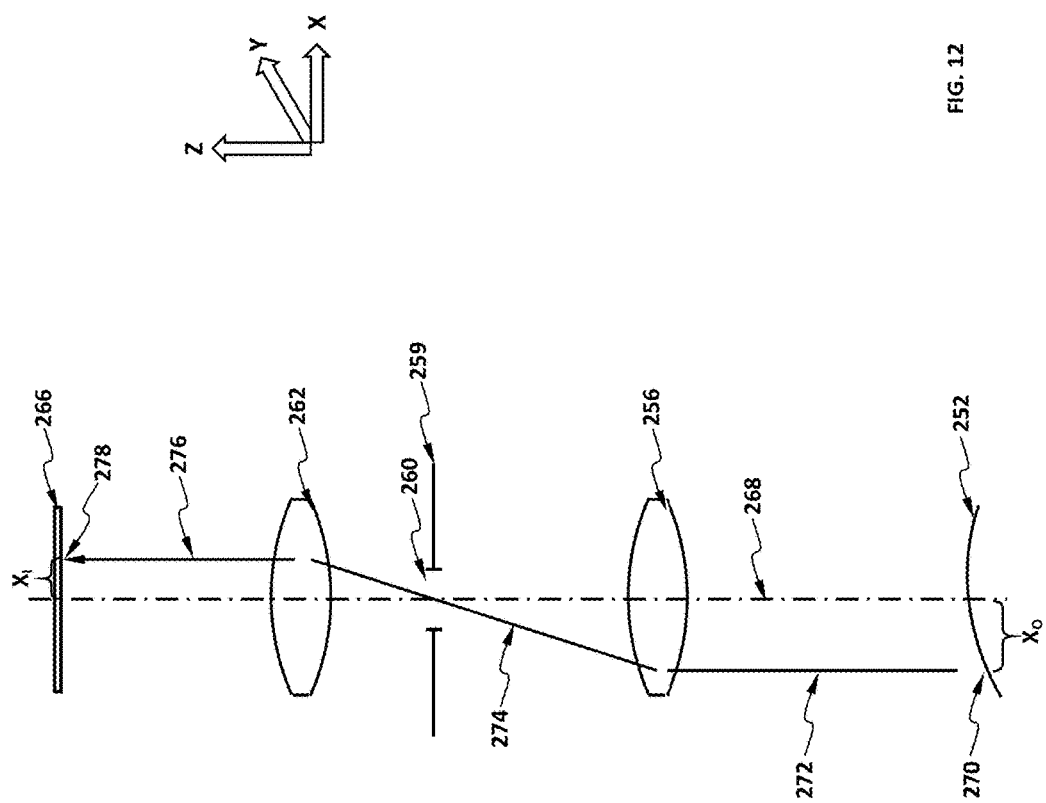
FIG. 12 is a diagram that illustrates the geometry of the light as it passes through the lens of the imaging arm of the scanner.

Refer now to FIG. 12, which is a cross-sectional representation of the imaging arm in scan-head 31, but simplified by removal of the fold mirror 58, showing an image sensor 266, a test surface 252, and a representative light ray consisting of an object space ray 272 which originates at object location 270 on test surface 252, internal ray 274 which passes through the aperture 260 of aperture stop 259, and image ray 276 which is incident at image sensor 266 at image location 278. Note that because the lens is telecentric in object space, object ray 272 is substantially parallel to lens axis 268. Also because the lens is telecentric in image space, image ray 276 is substantially parallel to lens axis 268.

During operation, the image sensor 266 is read out and the image is processed by the scan management computing device 84 to find the coordinates $(X_I, Y_I)$ of the image location 278. It is then a simple matter to find the coordinates $(X_O, Y_O)$ of the object location 270 from the known magnification, M, of the imaging arm lens: $X_O=X_I/M$ and $Y_O=Y_I/M$. Note that the position $(X_O, Y_O)$ is 1) where the two hairs of the projected cross-hairs cross, and 2) where vector R of FIG. 11 intersects the test surface 252 or 52. In a well-calibrated system, coordinates $X_I$ and $X_O$ are both precisely known relative to the origin of the coordinate system. Knowing $X_O$ allows for the actual length of vector R to be calculated since it terminates at location 270; this length is $L_R=(X_O-0.0)/A_R$. From here it is a simple matter to find the final unknown coordinate, $Z_O$, of the 3D location of the object location 270, because $Z_O=C_R L_R$.

During a 3D scan of the test surface 52 or 252 in which the MEMS mirror 46 rotates in response to the actuating voltages applied to it, the above mathematics must be applied to compute the object location 270 for each position of the scan. That is, for each scan position of the MEMS mirror 46, the components $A_N$, $B_N$, $C_N$ of the MEMS mirror 46 normal vector N must be computed, the components $A_R$, $B_R$, and $C_R$ of the reflected and projected light 110 must be computed, the location $(X_I, Y_I)$ of the cross-hair on the image sensor 66 or 266 must be computed, then the $(X_O, Y_O)$ coordinates of the 3D location on the test surface 52 must be computed, the length of the reflected projected light 110 beam must be computed, from which the $Z_O$ coordinate of the 3D location on the test surface 52 is computed.

Alternately, if the MEMS mirror 46 is replaced with a fixed stationary mirror and the scanning is accomplished by virtue of moving the test surface 252 or 52 relative to the scan-head 31, which in this example is stationary, then the above mathematical process is simplified because the direction cosines of vector N do not change during the scanning process. In this case, for each location of the test surface 252 or 52, the location $(X_I, Y_I)$ of the cross-hair on the image sensor 66 or 266 must be computed, then the $(X_O, Y_O)$ coordinates of the 3D location on the test surface 252 or 52 must be computed, the length of the reflected projected light 110 beam must be computed, from which the $Z_O$ coordinate of the 3D location on test surface 252 or 52 is computed.

However, if in the case where the scan-head 31 is moved as part of a 3D scan, regardless of whether the test surface 52 is moved or not, then the direction numbers $A_E$, $B_E$, $C_E$, of the projected light 110 beam exiting the optical-head must be computed. That is, for each scan position of the optical-head 31, the components $A_E$, $B_E$, $C_E$ of the projected light 110 beam must be computed, the location $(X_I, Y_I)$ of the cross-hair on the image sensor 66 or 266 must be computed, then the $(X_O, Y_O)$ coordinates of the 3D location on the test surface 52 must be computed, the length of the exiting projected light 110 beam must be computed, from which the $Z_O$ coordinate of the 3D location on the test surface 52 is computed.

Finally, if there is no scanning taking place during the 3D topographical measurement of the test surface 52, then there is no need for the above vector math as the deviations in the image (compared to the pattern of the reticle 36) on the image sensor 66 intrinsically contains the surface topography of the test surface 52.

As noted above, the math only provides accurate estimates of an object location $(X_O, Y_O, Z_O)$ if the telecentric lens is well calibrated. In particular, while image location $(X_I, Y_I)$ can be accurately computed in the image processing software executed on the scan management computing device 84, finding accurate values of $X_O = X_I/M$ and $Y_O = Y_I/M$ assumes that M, the magnification, is accurately known and does not vary across the field of view of the telecentric lens and also does not vary with the distance between the telecentric lens and the test surface 52.

In general, however, the magnification will be slightly different than the "design magnification" of the telecentric lens, and the magnification will vary across the field of view of the telecentric lens due to optical distortion (e.g., residual barrel or pincushion distortion, or a combination of them), and the magnification will vary a small amount in accordance with the distance between the test surface 52 and the telecentric lens (i.e., the telecentric lens will exhibit residual non-telecentric behavior in object space, over its working range or depth of field). Fortunately all of these variations in magnification can be quantized with a microdisplay-based calibration device as described below, and their effects counteracted when $(X_O, Y_O)$ is computed from $(X_I, Y_I)$.

To calibrate the magnification of the telecentric lens over its field of view and depth of field, the scan-head 31 is positioned over the microdisplay 130 such that the image of the pixelated display 132 is substantially centered on the image sensor 66, and the distance between the scan-head 31 and the pixelated display 132 is at the outermost range of its working depth of field. Note that at the start of the calibration process the pixel pitch of the pixelated display 132 is well-known either by its method of manufacture or by direct measurement, with, for example, a CMM (coordinate measurement machine).

Next a known pattern of pixels is activated on the pixelated display 132, such as identical groupings of pixels at the four corners of a small square, whose image on the image sensor 66 is shown in FIG. 15A, and the magnification at each of the four active groupings is calculated by software running on the scan management computing device 84, and the magnification values are stored for later processing.

Next another known pattern of pixels is activated on the pixelated display 132, such as identical groupings of pixels at the four corners of a middle-sized square, whose image on the image sensor 66 is shown in FIG. 15B, and the magnification at each of the four active groupings is calculated and stored for later processing.

Finally another known pattern of pixels is activated on the pixelated display 132, such as identical groupings of pixels at the four corners of a large square, whose image on the image sensor 66 is shown in FIG. 15C, and the magnification at each of the four active groupings is calculated and stored for later processing. Because the distortion and non-telecentricity properties of the lens being calibrated are generally symmetric about the axis of the lens, the distortion and non-telecentricity properties of the lens can now be determined over the entire object plane—at this object distance—by the use of interpolation.

Next the scan-head 31 is lowered a small amount, such as 200 μm, so the distance between the scan-head 31 and the microdisplay 130 is reduced. The process of displaying three different sized dot patterns on the pixelated display 132 is repeated, the lens magnification variations at this object plane location is again determined and stored for later use. The process of decreasing the lens-to-microdisplay 130 distance (and dot display and magnification determination) is repeated until the magnification has been characterized up to a distance between the scan-head 31 and the pixelated display 132 that corresponds to the innermost range of the working depth of field of the telecentric lens. At the completion of this calibration process, the exact magnification of the lens is known (through the use of interpolation between the discrete sample points) throughout its entire field of view and throughout its entire depth of field. This calibrated magnification data is then applied to the determination of $(X_O, Y_O, Z_O)$ from $(X_I, Y_I)$ as described above, although other calibration methods may be utilized.

Accordingly, with this technology, a highly accurate 3D map of a complex object, such as a crankshaft or camshaft, can be formed. The accuracy of the scanner can be 5 μm or better. The surface of the test object can be measured at a rate of 1 cm² per second. The sample point density can be 10,000 points/cm², which corresponds to a sample every 100 μm of scan distance on the object being measured.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. An optical scanner comprising:
    a light source located within a housing;
    an opaque reticle having an aperture, the reticle positioned within the housing to receive a first light beam emitted from the light source and configured to transmit a second light beam through the aperture, wherein the aperture forms a transmissive pattern for the second light beam;
    a micro-electromechanical scanning mirror positioned within the housing to receive the second light beam transmitted from the reticle and reflect the second light beam through a first window in the housing onto a surface of interest of an object, wherein the micro-electromechanical scanning mirror is configured to rotate to scan the second light beam along at least one axis of the object; and
    a light receiver configured to receive a third light beam from the surface of interest of the object through a second window in the housing, wherein the light receiver is configured to obtain one or more light position values to determine a parameter of the surface of interest of the object.

2. The optical scanner as set forth in claim 1, wherein the light source is a light emitting diode.

3. The optical scanner as set forth in claim 1, wherein the light source is a semiconductor laser.

4. The optical scanner as set forth in claim 1, wherein the light source is a pulsed light source.

5. The optical scanner as set forth in claim 1, wherein the light source has a wavelength of less than 500 nm.

6. The optical scanner as set forth in claim 1, wherein the light receiver further comprises an imaging lens.

7. The optical scanner as set forth in claim 6, wherein the imaging lens is telecentric in object space.

8. The optical scanner as set forth in claim 6 further comprising:
an optical filter configured to transmit substantially only light of a wavelength emitted by the light source.

9. The optical scanner as set forth in claim 6, wherein the imaging lens is positioned within the housing with an axis of the imaging lens substantially perpendicular to a least one location on the surface of interest of the object.

10. The optical scanner as set forth in claim 1 further comprising:
a projection lens positioned to project the second light beam having the transmissive aperture pattern onto the mirror.

11. The optical scanner as set forth in claim 1, wherein the housing has a width less than 25 mm.

12. The optical scanner as set forth in claim 1, wherein the transmissive pattern is an ellipse, a line, or a cross-hair pattern.

13. The optical scanner as set forth in claim 1, wherein the housing is sealed.

14. The optical scanner as set forth in claim 1, wherein the light receiver comprises at least a lens and a photosensor.

15. The optical scanner as set forth in claim 14, wherein the photosensor comprises at least one of a quadrant sensor, an image sensor, or a position sensing device.

16. The optical scanner as set forth in claim 1, wherein the mirror is fixedly located within the housing.

17. The optical scanner as set forth in claim 16 further comprising a rotatable stage configured to support the housing and to be movable with respect to the object.

18. The optical scanner as set forth in claim 16, wherein the rotatable stage is further configured to be translated along an axis.

19. The optical scanner as set forth in claim 17, wherein the rotatable stage is configured to perform one or more rotations or translations to scan the second light beam over an entire surface area of the object to generate a three-dimensional image.

20. The optical scanner as set forth in claim 1, wherein the micro-electromechanical scanning mirror is at least one of electrostatically or electromagnetically positioned within the housing.

21. The optical scanner as set forth in claim 1, wherein the micro-electromechanical scanning mirror is configured to rotate to scan the second light beam along the at least one axis of the object at a rate of about 1000 scans/second.

22. The optical scanner as set forth in claim 1, wherein the micro-electromechanical scanning mirror is configured to rotate to scan the second light beam along the at least one axis of the object at a rate of about 50 scans/second.

23. The optical scanner as set forth in claim 1, wherein the micro-electromechanical scanning mirror is further configured to have a scan pattern which is a raster pattern.

24. The optical scanner as set forth in claim 1 further comprising:
a staging positioned proximate to the housing, the staging configured to receive the object such that the second beam is reflected onto the surface of interest the object, wherein the staging is configured to perform one or more translations to scan the second light beam over an entire surface area of the object to generate a three-dimensional image.

25. An optical scanner comprising:
a light source located within a housing;
a reticle having an aperture, the reticle positioned within the housing to receive a first light beam emitted from the light source and configured to transmit a second light beam through the aperture;
a mirror positioned within the housing to receive the second light beam transmitted from the reticle and reflect the second light beam through a first window in the housing onto a surface of interest of an object;
a light receiver configured to receive a third light beam from the surface of interest of the object through a second window in the housing, wherein the light receiver is configured to obtain one or more light position values to determine a parameter of the surface of interest of the object;
a second light source located within the housing opposite the first light source;
a second reticle having a second aperture, the second reticle positioned within the housing to receive a fourth light beam emitted from the second light source and configured to transmit a fifth light beam through the second aperture; and
a second mirror positioned within the housing to receive the fifth light beam transmitted from the second reticle and reflect the fifth light beam through a third window in the housing onto the surface of interest of the object, wherein the light receiver is configured to receive a sixth light beam from the surface of interest of the object through the second window in the housing and to obtain one or more light position values to determine the parameter of the surface of interest of the object based on both the third light beam and the sixth light beam.

26. The optical scanner as set forth in claim 1 further comprising:
a right angle prism bonded to one of the first window or the second window of the housing, wherein the right angle prism is configured to provide total internal reflection of light passing through the right angle prism.

27. A method for generating a three-dimensional image of an object, the method comprising:
providing an optical scanner comprising:
a light source located within a housing;
an opaque reticle having an aperture, the reticle positioned within the housing to receive a first light beam emitted from the light source and configured to transmit a second light beam through the aperture, wherein the aperture forms a transmissive pattern for the second light beam;
a micro-electromechanical scanning mirror positioned within the housing to receive the second light beam transmitted from the reticle and reflect the second light beam through a first window in the housing onto a surface of interest of an object, wherein the micro-electromechanical scanning mirror is configured to rotate to scan the second light beam along at least one axis of the object; and
a light receiver configured to receive a third light beam from the surface of interest of the object through a second window in the housing, wherein the light receiver is configured to obtain one or more light position values to determine a parameter of the surface of interest of the object;

positioning the optical scanner with respect to the object;

receiving, by the light receiver, the third light beam from the surface of interest; and determining, based on the received third light beam from the surface of interest, the parameter of the surface of interest of the object.

28. The method as set forth in claim 27, wherein the light source is a light emitting diode.

29. The method as set forth in claim 27, wherein the light source is a semiconductor laser.

30. The method as set forth in claim 27, wherein the light source is a pulsed light source.

31. The method as set forth in claim 27, wherein the light source has a wavelength of less than 500 nm.

32. The method as set forth in claim 27, wherein the light receiver further comprises an imaging lens.

33. The method as set forth in claim 32, wherein the imaging lens is telecentric in object space.

34. The method as set forth in claim 32, wherein the optical scanner further comprises an optical filter configured to transmit substantially only light at a wavelength emitted by the light source.

35. The method as set forth in claim 32, wherein the imaging lens is positioned within the housing with an axis of imaging lens substantially perpendicular to a least one location on the surface of interest of the object.

36. The method as set forth in claim 27, wherein the optical scanner further comprises a projection lens positioned to project the second light beam having the transmissive aperture pattern onto the mirror.

37. The method as set forth in claim 27, wherein the housing has a width less than 25 mm.

38. The method as set forth in claim 27, wherein the transmissive pattern is an ellipse, a line, or a cross-hair pattern.

39. The method as set forth in claim 27, wherein the housing is sealed.

40. The method as set forth in claim 27, wherein the light receiver comprises at least a lens and a photosensor.

41. The method as set forth in claim 40, wherein the photosensor comprises at least one of a quadrant sensor, an image sensor, or a position sensing device.

42. The method as set forth in claim 27, wherein the micro-electromechanical scanning mirror is fixedly located within the housing.

43. The method as set forth in claim 42, wherein the optical scanner further comprises a rotatable stage configured to support the housing and to be movable with respect to the object.

44. The optical scanner as set forth in claim 42, wherein the rotatable stage is further configured to be translated along an axis.

45. The method of claim 44 further comprising:

performing one or more rotations or translations of the rotatable stage to scan the second light beam over an entire surface area of the object to generate a three-dimensional image.

46. The method as set forth in claim 27, further comprising:

scanning the second light beam emitted by the light source over an area of the surface of interest of the object by rotating the micro-electromechanical scanning mirror along the at least one axis of the object.

47. The method as set forth in claim 27, wherein the micro-electromechanical scanning mirror is at least one of electrostatically or electromagnetically positioned within the housing.

48. The method as set forth in claim 27, wherein the micro-electromechanical scanning mirror is configured to rotate to scan the second light beam along the at least one axis of the object at a rate of about 1000 scans/second.

49. The method as set forth in claim 27, wherein the micro-electromechanical scanning mirror is configured to rotate to scan the second light beam along the at least one axis of the object at a rate of about 50 scans/second.

50. The method as set forth in claim 27, wherein the micro-electromechanical scanning mirror is further configured to have a scan pattern which is a raster pattern.

51. The method as set forth in claim 27, wherein the optical scanner further comprises a staging positioned proximate to the housing, the staging configured to receive the object such that the second beam is reflected onto the surface of interest the object, the method further comprising:

performing one or more translations of the staging to scan the second light beam over an entire surface area of the object to generate a three-dimensional image.

52. A method for generating a three-dimensional image of an object, the method comprising:

providing an optical scanner comprising:
  a light source located within a housing;
  a reticle having an aperture, the reticle positioned within the housing to receive a first light beam emitted from the light source and configured to transmit a second light beam through the aperture;
  a mirror positioned within the housing to receive the second light beam transmitted from the reticle and reflect the second light beam through a first window in the housing onto a surface of interest of an object;
  a light receiver configured to receive a third light beam from the surface of interest of the object through a second window in the housing, wherein the light receiver is configured to obtain one or more light position values to determine a parameter of the surface of interest of the object;
  a second light source located within the housing opposite the first light source;
  a second reticle having a second aperture, the second reticle positioned within the housing to receive a fourth light beam emitted from the second light source and configured to transmit a fifth light beam through the second aperture; and
  a second mirror positioned within the housing to receive the fifth light beam transmitted from the second reticle and reflect the fifth light beam through a third window in the housing onto the surface of interest of the object, the method further comprising:

positioning the optical scanner with respect to the object;

receiving, by the light receiver, the third light beam and a sixth light beam from the surface of interest; and determining, based on the received third light beam and the received sixth light beam from the surface of interest, the parameter of the object to generate a three-dimensional image.

53. The method as set forth in claim 27, wherein the optical scanner further comprises:

a right angle prism bonded to one of the first window or the second window of the housing, wherein the right angle prism is configured to provide total internal reflection of light passing through the right angle prism.

* * * * *